(12) United States Patent
Nabeshi et al.

(10) Patent No.: US 11,533,014 B2
(45) Date of Patent: Dec. 20, 2022

(54) POWER CONVERTER, DRIVE, AND POWER STEERING DEVICE

(71) Applicant: Nidec Corporation, Kyoto (JP)

(72) Inventors: Kaori Nabeshi, Kyoto (JP); Takashi Kitamura, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 8 days.

(21) Appl. No.: 17/298,751

(22) PCT Filed: Nov. 22, 2019

(86) PCT No.: PCT/JP2019/045837
§ 371 (c)(1),
(2) Date: Jun. 1, 2021

(87) PCT Pub. No.: WO2020/116210
PCT Pub. Date: Jun. 11, 2020

(65) Prior Publication Data
US 2022/0060136 A1 Feb. 24, 2022

(30) Foreign Application Priority Data

Dec. 4, 2018 (JP) .............................. JP2018-226966

(51) Int. Cl.
*H02P 29/024* (2016.01)
*H02P 27/06* (2006.01)

(52) U.S. Cl.
CPC ............ *H02P 29/024* (2013.01); *H02P 27/06* (2013.01)

(58) Field of Classification Search
CPC .......... H02P 27/00; H02P 27/04; H02P 27/06; H02P 27/08; H02P 27/085; H02P 21/00; H02P 21/0003; H02P 21/14; H02P 21/22; H02P 23/00; H02P 23/0004; H02P 23/07; H02P 23/14; H02P 25/00; H02P 25/062; H02P 25/064; H02P 25/092; H02P 25/10; H02P 25/14; H02P 25/22; H02P 29/00; H02P 29/025; H02P 29/026;
(Continued)

(56) References Cited

U.S. PATENT DOCUMENTS

2018/0175779 A1* 6/2018 Koseki ..................... H02H 7/08

FOREIGN PATENT DOCUMENTS

| JP | 2014-192950 A | 10/2014 |
|----|---------------|---------|
| JP | 2015-080290 A | 4/2015 |
| JP | 6367744 B2 | 8/2018 |

OTHER PUBLICATIONS

Official Communication issued in International Patent Application No. PCT/JP2019/045837, dated Jan. 21, 2020.

* cited by examiner

*Primary Examiner* — Antony M Paul
(74) *Attorney, Agent, or Firm* — Keating & Bennett

(57) ABSTRACT

A power converter converts power from a power source into power to be supplied to a motor having n-phase (n is an integer of 3 or larger) windings. The power converter includes an inverter including switches connected to the windings, a controller to control operation of each of the switches, and a failure detector to detect a sign of failure in a drive system ranging from the power source to the motor. When a sign of failure is detected by the failure detector, the controller is configured or programmed to check presence or absence of a failure in the drive system while supplying power to the motor by causing the inverter to perform a failure operation.

17 Claims, 25 Drawing Sheets

(58) Field of Classification Search
CPC ...... H02P 29/027; H02P 29/028; H02P 11/00;
H02P 11/06; H02P 6/00; H02P 6/12;
H02P 6/24; H02P 6/32; H02P 1/00; H02P
1/04; H02P 1/16; H02P 1/163; H02P
1/26; H02P 1/42; H02P 1/46; H02P 3/00;
H02P 3/06
See application file for complete search history.

| DETECTION CONDITIONS | Bit ALLOCATION | Pattern0 Y1 | Pattern1 Y1 | Pattern2 Y3 | Pattern3 Y1 | Pattern4 Y1 | Pattern5 2phase | Pattern6 2phase |
|---|---|---|---|---|---|---|---|---|
| LOW-SIDE CONTROL ABNORMALITY | 0bit(1) | 0 | 0 | 1 | 1 | 0 | 0 | 0 |
| HIGH-SIDE CONTROL ABNORMALITY | 1bit(2) | 0 | 0 | 1 | 0 | 0 | 0 | 1 |
| PHASE-POTENTIAL VALUE ABNORMALITY | 2bit(4) | 0 | 0 | 0 | 0 | 1 | 1 | 0 |
| Pr0r CONTROL ABNORMALITY AND OTHERS | 3bit(8) | 1 | 0 | 0 | 0 | 0 | 0 | 0 |
| VR VALUE ABNORMALITY | 4bit(16) | 0 | 1 | 0 | 0 | 0 | 0 | 0 |
| PHASE CURRENT VALUE ABNORMALITY | 5bit(32) | 0 | 0 | 0 | 0 | 0 | 1 | 0 |
| Vg VALUE ABNORMALITY | 6bit(64) | 0 | 0 | 1 | 0 | 0 | 0 | 1 |
| Vn VALUE ABNORMALITY | 7bit(128) | 0 | 0 | 0 | 0 | 0 | 0 | 0 |

FIG. 6

POWER CONVERTER, DRIVE, AND POWER STEERING DEVICE

CROSS REFERENCE TO RELATED APPLICATIONS

This is a U.S. national stage of PCT Application No. PCT/JP2019/045837, filed on Nov. 22, 2019, and with priority under 35 U.S.C. § 119(a) and 35 U.S.C. § 365(b) being claimed from Japanese Patent Application No. 2018-226966, filed Dec. 4, 2018, the entire disclosures of which are hereby incorporated herein by reference.

1. FIELD OF THE INVENTION

The present invention relates to a power converter, a drive, and a power steering device.

2. BACKGROUND

Conventionally, an inverter drive system that converts power of a motor by two inverters is known. Further, there is also known an inverter drive system in which inverters are connected to both ends of each winding of the motor to supply power independently to each winding.

For example, there is a power converter having two inverter units. A failure in a switching element is detected by a failure detection means. Then, when a failure occurs in the switching element, in order to continue driving of the rotary electric machine (motor), on/off operation control of the switching element is switched from the control in the normal state to the control in the failed state and the rotary electric machine is driven.

However, in the conventional device, a torque loss may occur during diagnosis for identifying a faulty part.

SUMMARY

One example embodiment of a power converter according to the present disclosure is a power converter that converts power from a power source into power to be supplied to a motor having n-phase (n is an integer of 3 or larger) windings. The power converter includes an inverter including a plurality of switches connected to the windings, a controller to control operation of each of the switches of the inverter, and a failure detector to detect a sign of failure in a drive system ranging from the power source to the motor. When a sign of failure is detected by the failure detector, the controller is configured or programmed to check presence or absence of a failure in the drive system while supplying the power to the motor by causing the inverter to perform a failure operation. Further, one example embodiment of a drive according to the present disclosure includes the power converter described above and a motor to which the power converted by the power converter is supplied.

Further, one example embodiment of a power steering device according to the present disclosure includes the power converter described above, a motor to which the power converted by the power converter is supplied, and a power steering mechanism to be driven by the motor.

The above and other elements, features, steps, characteristics and advantages of the present disclosure will become more apparent from the following detailed description of the example embodiments with reference to the attached drawings.

BRIEF DESCRIPTION OF THE DRAWINGS

FIG. 6 is a diagram showing a correspondence relationship between malfunction detection and drive patterns.

DETAILED DESCRIPTION

Hereinafter, example embodiments of power converters, drives, and power steering devices of the present disclosure will be described in detail with reference to the accompanying drawings. However, in order to avoid the following description from being unnecessarily redundant and to make it easier for those skilled in the art to understand, a detailed description more than necessary may be omitted. For example, a detailed description of a well-known item or a redundant description of substantially the same configuration may be omitted.

Figure 1:
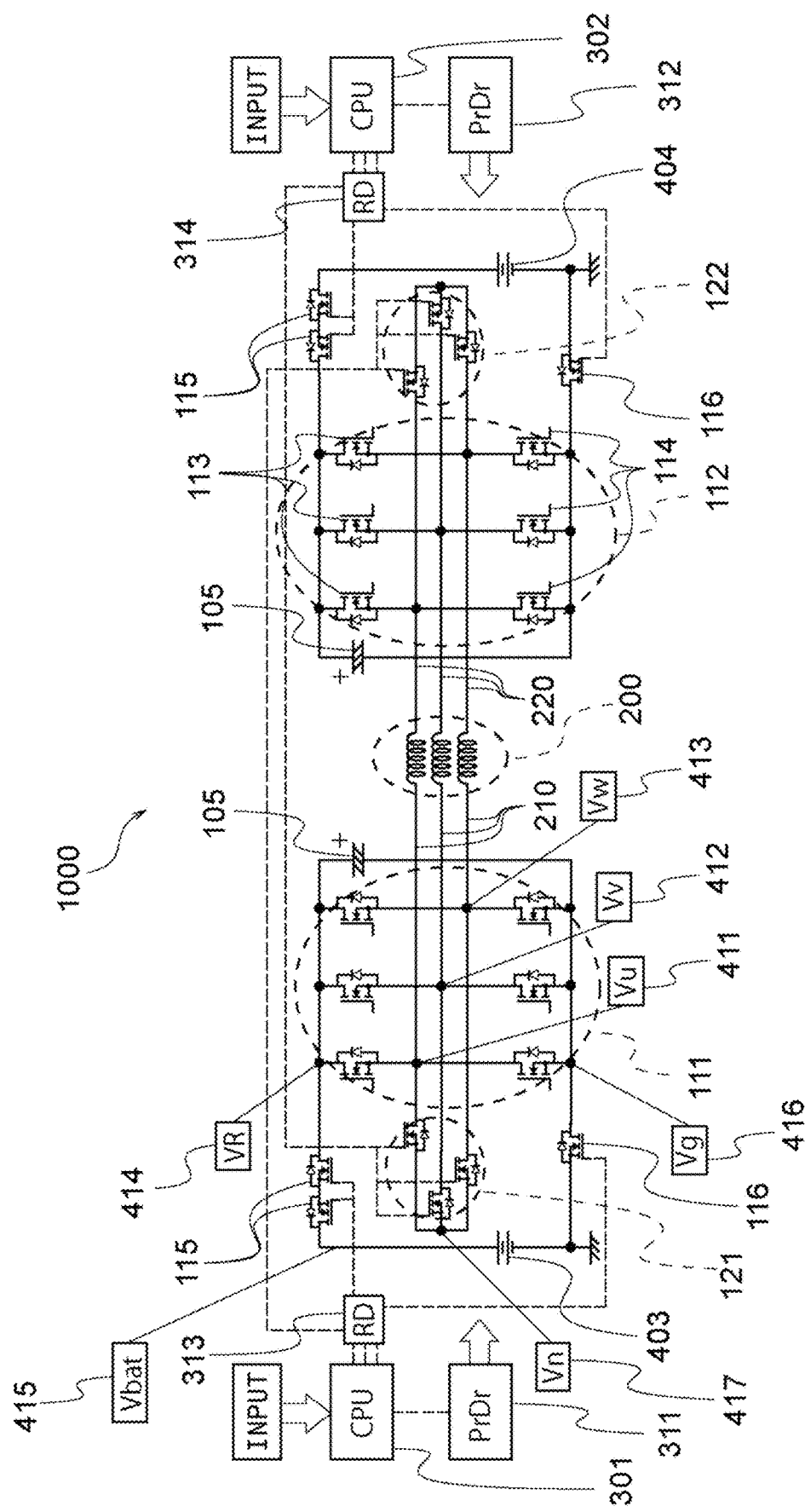
FIG. 1 is a diagram schematically showing a circuit configuration of a motor drive assembly according to an present example embodiment of the present invention.

In the present specification, example embodiments of the present disclosure will be described by taking, as an example, a power converter that converts electric power from a power source into electric power to be supplied to a three-phase motor having three-phase (U-phase, V-phase, W-phase) windings (sometimes referred to as "coils"). However, a power converter that converts electric power from a power source into power supplied to an n-phase motor having n-phase (n is an integer of 4 or more) windings such as four-phase or five-phase is also within the scope of the present disclosure. FIG. 1 is a diagram schematically showing a circuit configuration of a motor drive assembly 1000 according to the present example embodiment.

The motor drive assembly 1000 includes inverters 111 and 112, neutral point relay circuits 121 and 122, a motor 200, control circuits 301 and 302, inverter drive circuits 311 and 312, and switch drive circuits 313 and 314.

In the present specification, the motor drive assembly 1000 including the motor 200 as a component will be described. The motor drive assembly 1000 including the motor 200 corresponds to an example of a drive of the present disclosure. However, the motor drive assembly 1000 may be a device for driving the motor 200, which does not include the motor 200 as a component. The motor drive assembly 1000 without the motor 200 corresponds to an example of a power converter of the present disclosure.

The motor 200 is, for example, a three-phase AC motor. The motor 200 has U-phase, V-phase and W-phase coils. The winding method of the coil is, for example, concentrated winding or distributed winding.

The motor drive assembly 1000 is connected to power sources. The power sources include a first power source 403 and a second power source 404 each of which is independent. The power sources 403 and 404 generate a predetermined power source voltage (for example, 12V). As each of the power sources 403 and 404, for example, a DC power source is used. However, each of the power sources 403 and 404 may be an AC-DC converter or a DC-DC converter, or may be a battery (storage battery). In FIG. 1, the first power source 403 for the first inverter 111 and the second power source 404 for the second inverter 112 are shown as examples, but the motor drive assembly 1000 may be connected to a single power source shared by the first inverter 111 and the second inverter 112. Further, the motor drive assembly 1000 may have a power source inside.

The two inverters 111 and 112 included in the motor drive assembly 1000 are connected to the common ground. Therefore, the current supplied from the two power sources 403 and 404 can flow to the ground from either side of the two inverters 111 and 112.

The motor drive assembly 1000 includes a capacitor 105. The capacitor 105 is a so-called smoothing capacitor which stabilizes the power source voltage and suppresses torque ripple by absorbing the recirculation current generated by the motor 200. The capacitor 105 is, for example, an electrolytic capacitor, and the capacitance and the number of capacitors to be used are appropriately determined according to design specifications and the like.

The motor drive assembly 1000 can convert the power from the power sources 403 and 404 into the power to be supplied to the motor 200, by the two inverters 111 and 112. For example, the motor drive assembly 1000 can convert DC power into three-phase AC power that is pseudo sine waves of U-phase, V-phase, and W-phase.

Of the two inverters 111 and 112, the first inverter 111 is connected to one ends 210 of the coils of the motor 200, and the second inverter 112 is connected to the other ends 220 of the coils of the motor 200. In the present specification, "connection" between parts (components) means an electrical connection unless otherwise specified.

Each of the inverters 111 and 112 includes a bridge circuit having three legs. The three legs provided to each of the inverters 111 and 112 are connected to the U-phase, V-phase, and W-phase windings of the motor 200, respectively. Each leg includes a high-side switch element 113 connected between the power source and the motor 200, and a low-side switch element 114 connected between the motor 200 and the ground. Only one of the two inverters 111 and 112 is described using reference numerals to avoid complication in the illustration, but each of the inverters 111 and 112 is provided with three high-side switches 113 and three low-side switches 114. As a switch element, for example, a field effect transistor (MOSFET or the like) or an insulated gate bipolar transistor (IGBT) is used. When the switch element is an IGBT, a diode (freewheel) is connected in antiparallel with the switch element.

The neutral point relay circuits 121 and 122 are connected to the coils of the motor 200 in parallel with the inverters 111 and 112. The neutral point relay circuits 121 and 122 can perform switching between connection and disconnection of the coils of the motor 200. In other words, the neutral point relay circuits 121 and 122 are connected to the inverters 111 and 112 and the coils of the motor 200 to form a neutral point for the three-phase windings. Each of the neutral point relay circuits 121 and 122 includes three switches in each of which one end is commonly connected to the node and the other end is connected to the coil of each phase of the motor 200. As the switch element described above, for example, a semiconductor switch element such as a MOSFET or a mechanical relay is used.

The motor drive assembly 1000 further includes a separation switch 115 for switching connection/disconnection between each of the inverters 111 and 112 and the power source, and a separation switch 116 for switching connection/disconnection between each of the inverters 111 and 112 and the ground.

The control circuits 301 and 302 are, for example, CPUs, and the target torque of the motor 200 or the like is input from an external device such as a computer for controlling a power steering device.

The control circuits 301 and 302 set a target current value based on a rotation signal of the motor 200 detected by an angle sensor or the like (not shown), the target torque described above, and a detection result of a potential sensor described later, and controls driving of the motor 200 by the inverters 111 and 112. The control circuits 301 and 302 control driving of the inverters 111 and 112 via the inverter drive circuits 311 and 312. Specifically, the control circuits 301 and 302 generate PWM signals for controlling on/off operation of the respective switches provided to the inverters 111 and 112 according to the target current value, and by giving the PWM signals to the inverter drive circuits 311 and 312, control driving of the inverters 111 and 112.

The inverter drive circuits 311 and 312 are, for example, gate drivers. The inverter drive circuits 311 and 312 generate control signals (for example, gate control signals) for controlling on/off operation of the respective switches in the inverters 111 and 112 according to the PWM signal, and give the generated control signals to the respective switches.

The control circuits 301 and 302 control operation of the separation switches 115 and 116 and the neutral point relay circuits 121 and 122 via the switch drive circuits 313 and 314. Sharing of control targets by the two control circuits 301 and 302 will be described later. The switch drive circuits 313 and 314 follow the signals determining the on/off states of the neutral point relay circuits 121 and 122 from the control circuits 301 and 302 to generate control signals to turn on/off the switches in the neutral point relay circuits 121 and 122, and give the generated control signals to the respective switches.

The control circuits 301 and 302 may have the functions of the inverter drive circuits 311 and 312 and the switch drive circuits 313 and 314. In that case, the inverter drive circuits 311 and 312 and the switch drive circuits 313 and 314 are omitted.

The motor drive assembly 1000 further includes potential sensors. The potential sensors include a U-phase potential sensor 411, a V-phase potential sensor 412, a W-phase potential sensor 413, a supply potential sensor 414, a power source potential sensor 415, a ground potential sensor 416, and a neutral point potential sensor 417. In order to avoid complications in the drawing, the potential sensors are shown only around the inverter 111 on the left side in FIG. 1, but the potential sensors are similarly provided around the inverter 112 on the right side in FIG. 1.

The U-phase potential sensor 411 detects the potential on the connection line connecting the U-phase leg of the inverter 111 or 112 and the U-phase winding of the motor 200. The V-phase potential sensor 412 detects the potential on the connection line connecting the V-phase leg of the inverter 111 or 112 and the V-phase winding of the motor 200. The W-phase potential sensor 413 detects the potential on the connection line connecting the W-phase leg of the inverter 111 or 112 and the W-phase winding of the motor 200. Although not shown, a current sensor is also provided for each of the UVW phases, and the current value in each of the UVW phases is also detected.

The supply potential sensor 414 detects the potential on the connection line connecting the separation switch 115 on the power source side and the inverter 111 or 112. The power source potential sensor 415 detects the potential on the connection line connecting the power source 403 or 404 and the separation switch 115 on the power source side. The ground potential sensor 416 detects the potential on the connection line connecting the separation switch 116 on the ground side and the inverter 111 or 112. The neutral point potential sensor 417 detects the potential in the neutral point relay circuit 121 or 122.

By detecting the potential with the ground potential sensor 416, a failure of the separation switch 116 for ground separation and a failure of a switch element in the inverter 111 or 112 can be separated. Further, since the voltage of the power source 403 or 404 is detected by the power source potential sensor 415, a failure of the power source 403 or 404 and a failure of the circuit system can be separated.

The U-phase potential sensor 411, the V-phase potential sensor 412, the W-phase potential sensor 413, and the neutral point potential sensor 417 are examples of the detectors that detect internal potentials of each of the inverters 111 and 112 and each of the neutral point relay circuits 121 and 122.

The motor drive assembly 1000 includes a first system corresponding to one end 210 side of the coils (windings) of the motor 200 and a second system corresponding to the other end 220 side of the coils (windings) of the motor 200. That is, the motor drive assembly 1000 includes a circuit system including an inverter, a neutral point relay circuit, and the detectors at each of one ends 210 and the other ends 220 of the windings of the motor 200. The power is supplied to the inverter 111 of the first system from the power source 403 of the first system, and the power is supplied to the inverter 112 of the second system from the power source 404 of the second system.

The operation of the inverter 111 and the separation switches 115 and 116 of the first system is controlled by the control circuit 301 of the first system, and the operation of the inverter 112 and the separation switches 115 and 116 of the second system is controlled by the control circuit 302 of the second system. Since the drive system including the power source and the control circuit is made redundant including the power source, even when the power source in one system fails, power supply is continued by the other system, as will be described later.

Further, detected values by the potential sensors 411 to 417 of the first system are input to the control circuit 301 of the first system, and detected values by the potential sensors 411 to 417 of the second system are input to the control circuit 302 of the second system.

Meanwhile, operation of the neutral point relay circuit 121 of the first system is controlled by the control circuit 302 of the second system, and operation of the neutral point relay circuit 122 of the second system is controlled by the control circuit 301 of the first system.

That is, the control circuit 301 of the first system is connected to the detectors on the one ends 210 side of the windings of the motor 200, and controls the inverter 111 on the one ends 210 side and the neutral point relay circuit 122 on the other ends 220 side of the windings of the motor 200. The control circuit 302 of the second system is connected to the detectors on the other ends 220 side of the windings of the motor 200, and controls the inverter 112 on the other ends 220 side and the neutral point relay circuit 121 on the one ends 210 side of the windings of the motor 200. In the present example embodiment, the two control circuits 301 and 302 share the control targets as described above. However, as a modified example, both of the two control circuits 301 and 302 may control the entire switches of the first system and the second system.

In the present example embodiment, the two control circuits 301 and 302 can communicate with each other, and the operation of the two inverters 111 and 112 may be controlled by the cooperation of the two control circuits 301 and 302. However, the speed of mutual communication between the control circuits 301 and 302 is lower, compared with the speed of controlling operation of the respective switches via the inverter drive circuits 311 and 312 and the switch drive circuits 313 and 314, and the speed of acquiring detected values from the respective potential sensor 411 to 417. The drive control of the inverters 111 and 112 by the control circuits 301 and 302 includes control in the normal state and control in the failed state.

The control circuits 301 and 302 can switch the control of the inverters 111 and 112 between the control in the normal state and the control in the failed state. Here, "normal" refers to a state where all of the power sources 403 and 404, the control circuits 301 and 302, the inverters 111 and 112, the neutral point relay circuits 121 and 122, the separation switches 115 and 116, and the motor 200 function correctly.

Figure 2:
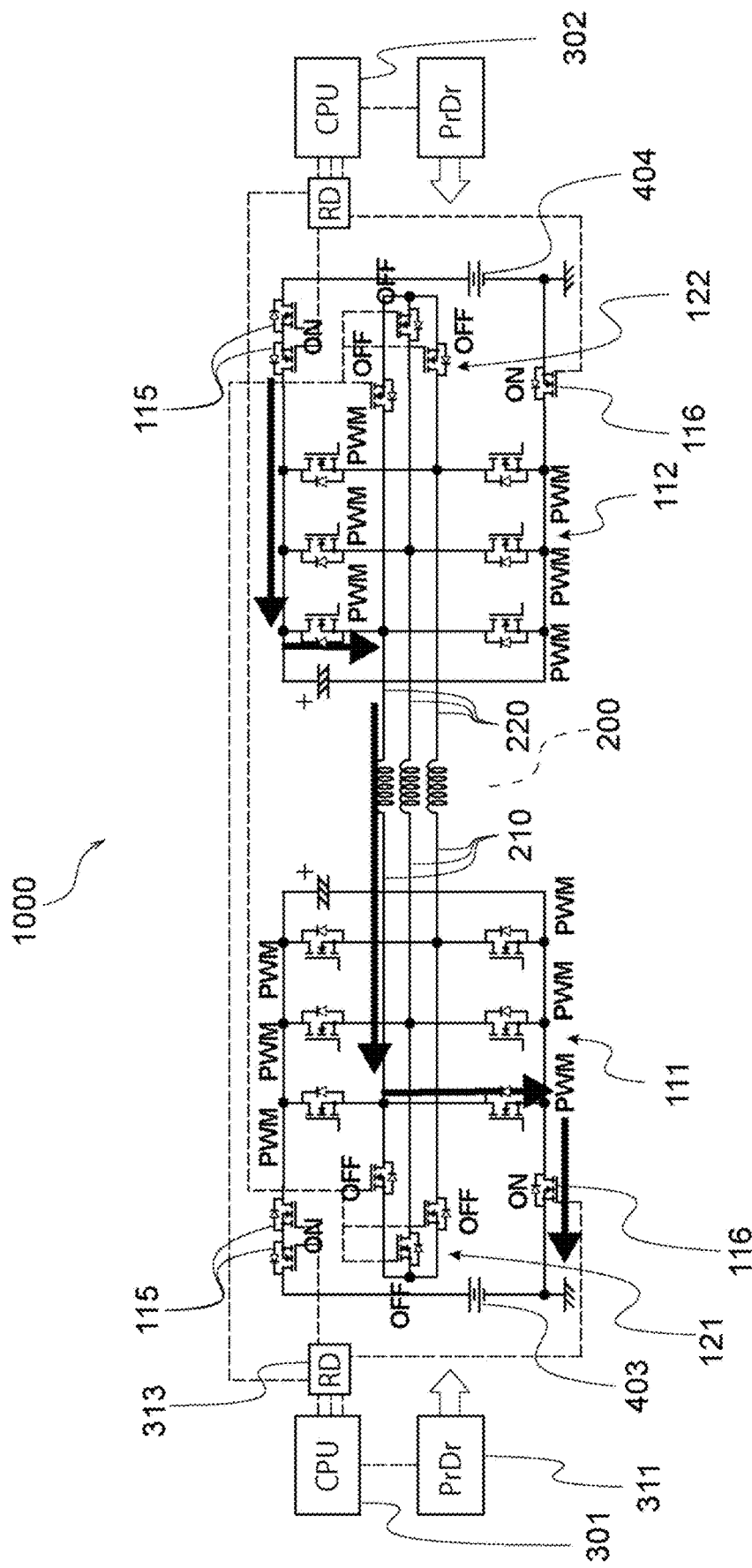
FIG. 2 is a diagram showing the operation of the motor drive assembly in the normal state.

"Failed" refers to a state where the function is lost in any of them. Hereinafter, a specific example of the operation of the motor drive assembly 1000 will be described, and a specific example of the operation of the inverters 111 and 112 will be mainly described. FIG. 2 is a diagram showing the operation of the motor drive assembly 1000 in the normal state.

In the normal state, the control circuits 301 and 302 turn off both the two neutral point relay circuits 121 and 122. As a result, the coils of the respective phases of the motor 200 are disconnected from each other. "The neutral point relay circuit 121 (122) is turned off" means that all three switches provided to the neutral point relay circuit 121 (122) are turned off.

When the neutral point relay circuit 121 of the first system is turned off, one ends 210 of the coils of the respective phases of the motor 200 are insulated from each other, and when the neutral point relay circuit 122 of the second system is turned off, the other ends 220 of the coils of the respective phases of the motor 200 are insulated from each other.

Further, the control circuits 301 and 302 turn on the separation switches 115 and 116. Thereby, the two inverters 111 and 112 are connected to the power sources 403 and 404 and the ground.

Figure 3:
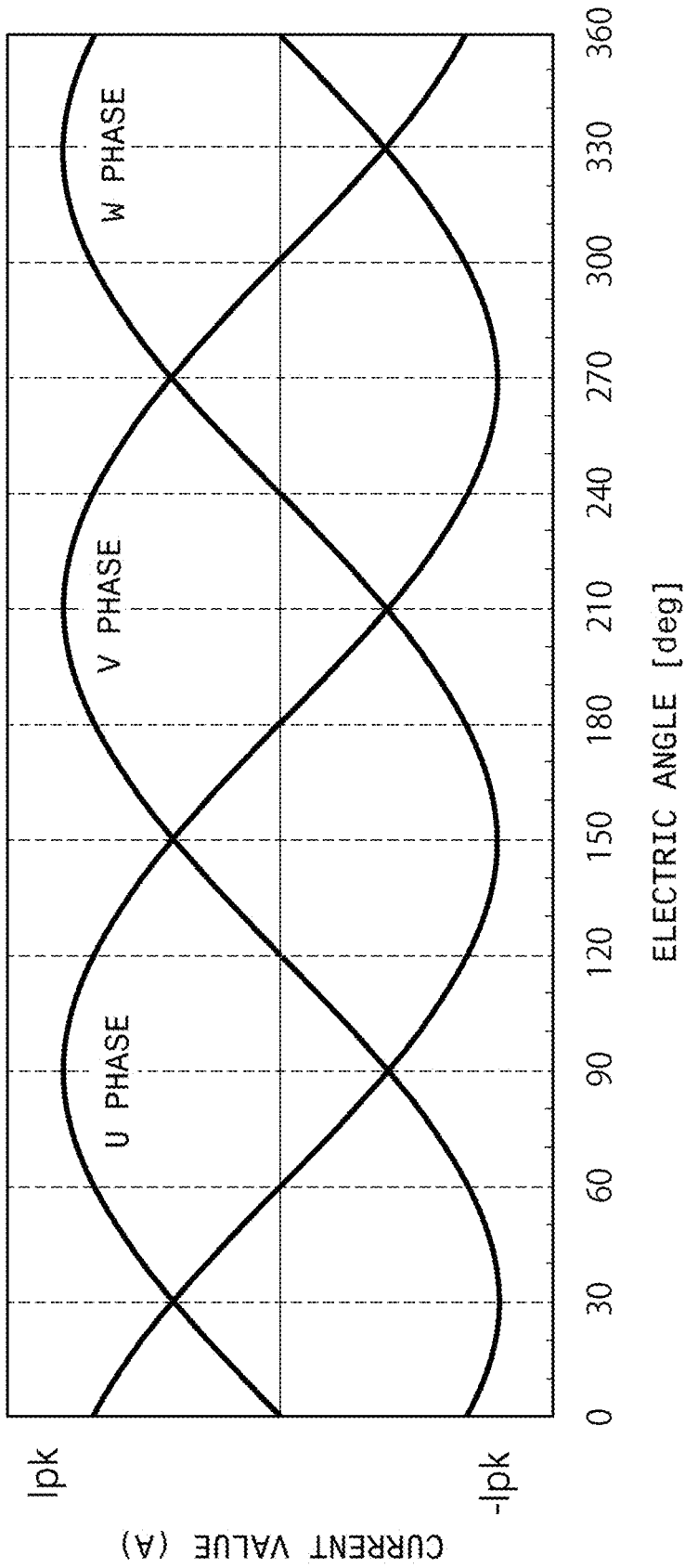
FIG. 3 is a diagram showing current values flowing through the coils of respective phases of the motor in the normal state.

In this connected state, the control circuits 301 and 302 perform PWM control on the switches of the two inverters 111 and 112 to perform three-phase energization control to thereby drive the motor 200. FIG. 2 shows, as an example, the path of the current flowing through one phase of the motor 200 at a specific time point. In this example, the current supplied from the power source 404 of the second system, of the two systems, to the inverter 112 of the second system passes through the winding of the motor 200 and flows from the inverter 111 of the first system to the ground. The current may be supplied from the first system side and flow to the second system side, or may flow to a winding of a phase other than the phase shown in FIG. 2. FIG. 3 is a diagram showing current values flowing through the respective coils of the respective phases of the motor 200 in the normal state.

FIG. 3 shows current waveforms (sine waves) obtained by plotting the current values flowing through the U-phase, V-phase, and W-phase coils of the motor 200 when the inverters 111 and 112 are controlled according to the three-phase energization in the normal state. The horizontal axis of FIG. 3 indicates the motor electric angle (deg), and the vertical axis indicates the current value (A). $I_{pk}$ represents a maximum current value (peak current value) of each phase. The inverters 111 and 112 can also drive the motor 200 using, for example, a square wave, besides the sine wave illustrated in FIG. 3.

In the current waveform shown in FIG. 3, the total current flowing through the three-phase coils in consideration of the direction of the current is "0" for each electric angle. However, according to the circuit configuration of the inverters 111 and 112, the current flowing through the three-phase coils is controlled independently. Therefore, the inverters 111 and 112 can also perform drive operation in which the total current takes a value other than "0".

For example, in the power steering mechanism or the like, even if a failure occurs in the motor drive assembly 1000, it is required to continue driving the motor 200 by the control in the failed state. Therefore, the control circuits 301 and 302 analyze potential detection values of the respective locations obtained from the potential sensors 411 to 417 during control in the normal state and response results of the switches obtained from the inverter drive circuits 311 and 312 and the switches 313 and 314 to detect a sign of failure.

That is, the control circuits 301 and 302 have a function as a failure detector that detects a sign of failure in the drive system ranging from the power sources 403 and 404 to the motor 200. Further, in the present example embodiment, the control circuits 301 and 302 detect an abnormality in state values (for example, potential detection values and response results) at respective locations in the drive system to thereby detect a sign of failure in the drive system.

Such an analysis can quickly detect occurrence of a failure, but what is detected by this analysis is a sign of failure, which may be misdetection. Therefore, after a failure is detected, a process of confirming the location where the failure has occurred is performed, and if it is misdetection, control under the normal state is performed.

Figure 4:
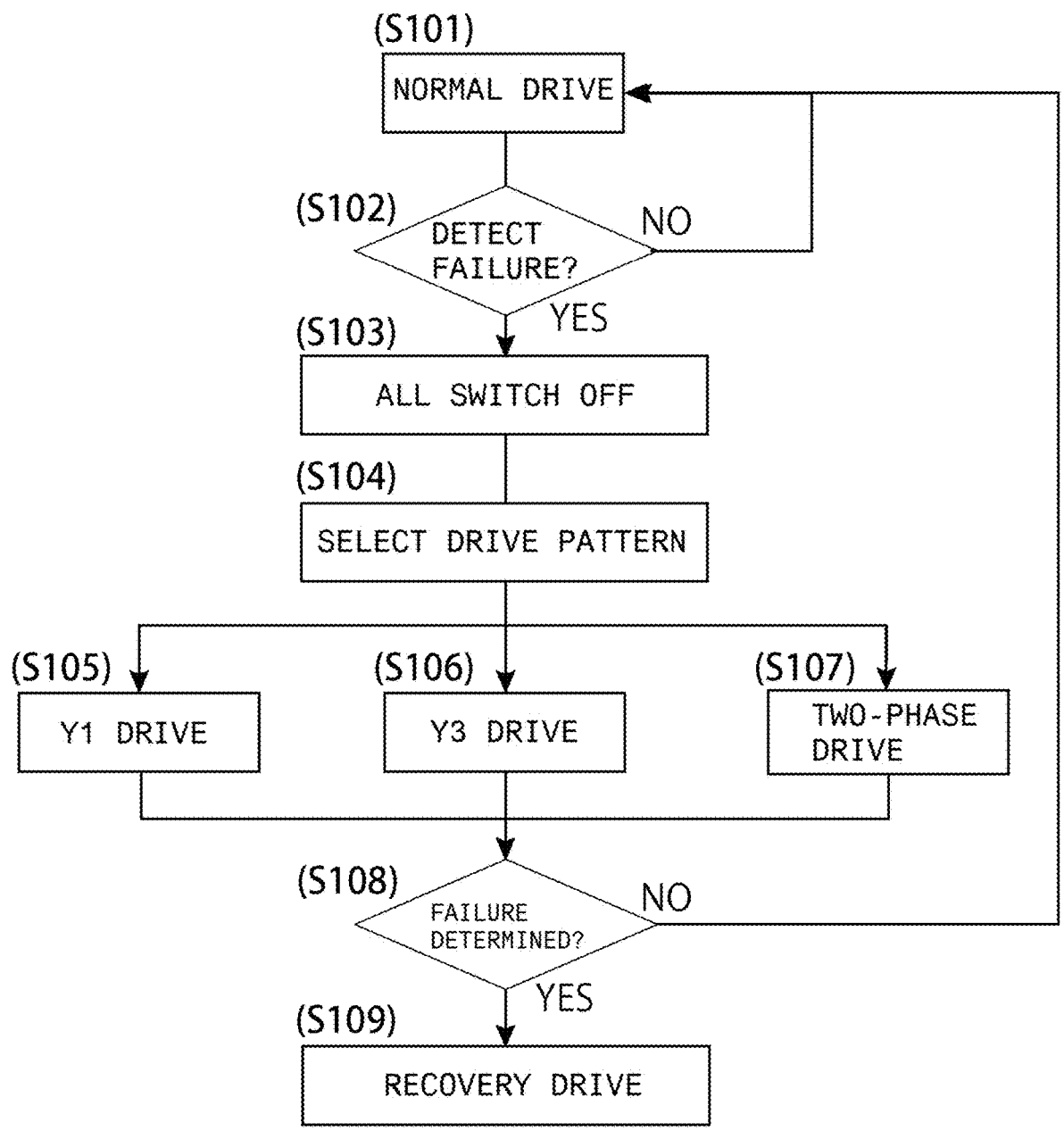
FIG. 4 is a flowchart showing a processing procedure executed by a control circuit to detect a failure.

The failed part confirmation process takes time because operation control by the cooperation of the two control circuits 301 and 302 may be required. Therefore, in the present example embodiment, a device is provided to prevent a torque loss of the motor 200 from occurring during the confirmation process. FIG. 4 is a flowchart showing a processing procedure performed by the control circuits 301 and 302 when a failure is detected.

First, the motor 200 is driven by the control in the normal state (step S101), and as described above, a sign of failure is detected by the analysis of potential detection values and the like (step S102). If no sign of failure is detected (step S102; NO), the motor 200 continues to be driven by the control in the normal state.

If a sign of failure is detected (step S102; YES), all switches of the inverters 111 and 112 are temporarily turned off to prevent the failure from spreading elsewhere in the motor drive assembly 1000 (step S103). Hereinafter, the state in which all the switches are turned off in this way may be referred to as a fire spread prevention state.

Then, in the fire spread prevention state, the operation (drive patterns) of the inverters 111 and 112, executed to continue driving of the motor 200 in the event of failure, is selected from a plurality of types (here, three types as an example) of operations (drive patterns) (step S104) and executed (steps S105 to S107). The drive of the motor 200 by the drive pattern selected here is hereinafter referred to as temporary drive. The drive pattern in the temporary drive is a drive pattern in the control when a sign of failure is observed, and is a drive pattern different from the drive pattern in the control in the normal state. Note that hereinafter, description will be given based on the premise that the "failure operation (drive pattern for temporary drive)" refers to a drive pattern from when a sign of failure is found until the failure is confirmed, and the definition is different from "failure avoidance operation (drive pattern for recovery drive)" after the failure has been confirmed, which will be described later.

The selection of a drive pattern will be described in detail below, but in the present example embodiment, as one of the drive patterns, Y1 drive (step S105) in which a neutral point is formed by one of the neutral point relay circuits 121 and 122 is adopted. Further, in the present example embodiment, as drive patterns, Y3 drive (step S106) in which one of the inverters 111 and 112 is neutralized by the switches in such an inverter 111 or 112, and two phase drive (step S107) in which two phases of the three UVW phases are used for driving, are also adopted. In the power converter of the present disclosure, it is desirable that the failure operation (drive pattern for temporary drive) is selected and executed from a plurality of types of operation including at least two of these three drive patterns.

In the inverters 111 and 112, during the time when the control circuits 301 and 302 select the failure operation (drive pattern for temporary drive), all of the switches are turned off to be in a fire spread prevention state, so that no current flows through the motor 200. However, since selection of a drive pattern is performed in a short time based on the potential detection values of the respective locations obtained from the potential sensors 411 to 417, a torque loss of the motor 200 is avoided.

In the present example embodiment, the failed part in the motor drive assembly 1000 is confirmed while the motor 200 is driven by any of the above three drive patterns. That is, when a sign of failure is detected, the control circuits 301 and 302 check presence or absence of failure in the drive system ranging from the power sources 403 and 404 to the motor 200, while allowing the inverters 111 and 112 to perform failure operation to thereby supply power to the motor 200. As described above, although the confirmation process takes time, a torque loss is avoided because the motor 200 is continuously driven by the temporary drive. The duration of such temporary drive is, for example, several tens ms. The drive pattern in the temporary drive is a drive pattern that enables more accurate failure diagnosis while continuing driving of the motor 200 when a sign of failure is detected. In such temporary drive, the presence or absence of failure and the location of the failure are confirmed while the motor drive assembly 1000 is maintained by stopping the location where there is a sign of failure. Therefore, the motor drive assembly 1000 is required to have redundancy so that it can be continuously driven without using some functions. The circuit structure in which the neutral point relay circuits 121 and 122 are provided to the inverters 111 and 112 is an example of such redundancy.

If no failed part is found as a result of the confirmation process (step S108: NO), the failure detection is misdetection. Therefore, the process returns to step S101, and the motor 200 is driven by the control in the normal state. That is, when the non-existence of failure is confirmed as a result of failure confirmation, the control circuits 301 and 302 cause the inverters 111 and 112 to perform the normal operation. On the other hand, if the failed part is determined as a result of the confirmation process (step S108: YES), the process proceeds to step S109, and the motor 200 is continuously driven by the recovery drive.

The recovery drive is drive that avoids use of a confirmed failed part. In other words, when the existence of failure is confirmed, the control circuits 301 and 302 supply power to the motor 200 by causing the inverters 111 and 112 to perform a failure avoidance operation that avoids use of the portion where the failure occurred.

The drive control may be different between the recovery drive and the temporary drive, but in the present example embodiment, the same drive control is executed for the recovery drive and the temporary drive. As a result, only a few control changes are needed. In the power converter of the present disclosure, the temporary drive may always be, for example, the Y1 drive, and the recovery drive may be selected from the Y1 drive, the Y3 drive, and the two-phase drive.

Figure 5:
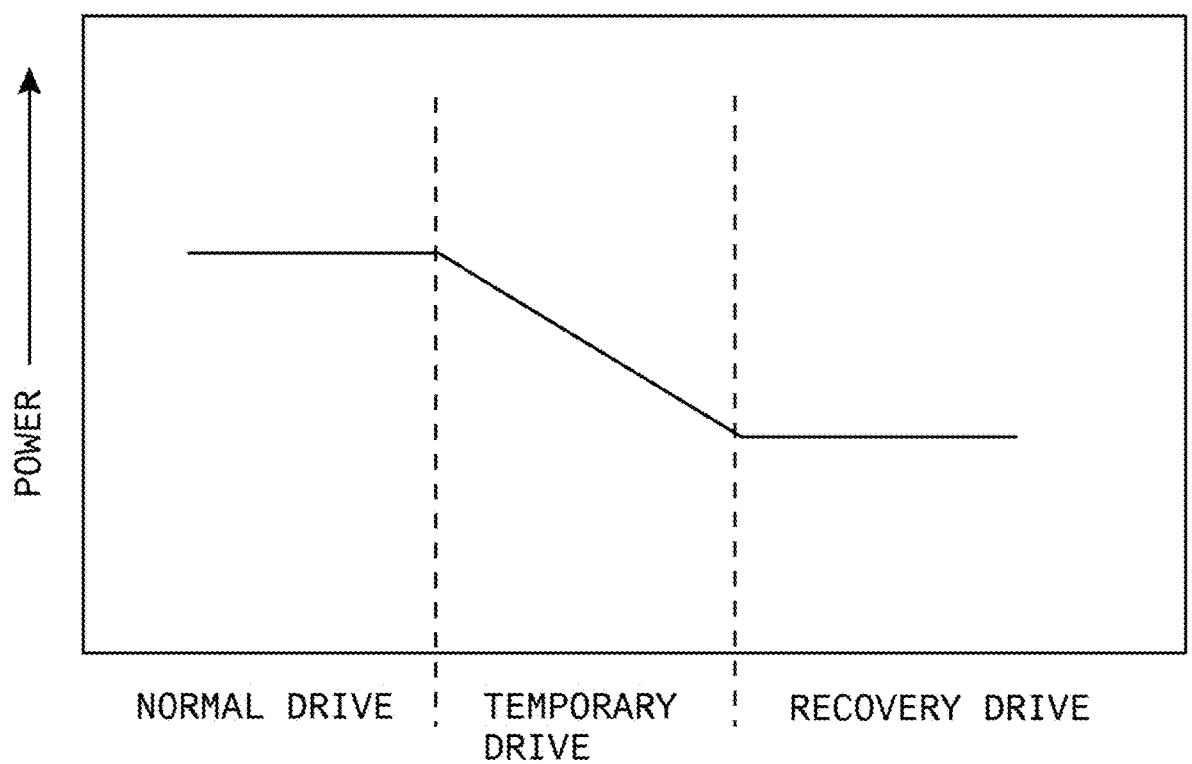
FIG. 5 is a diagram showing output adjustment during temporary drive.

Since driving of the motor 200 by the recovery drive avoids use of the failed part, the upper limit of the power is lower than that by the driving of the motor 200 by the control in the normal state using the entire motor drive assembly 1000. Since it is desired to avoid a sudden power change when shifting to the recovery drive, the power is adjusted during the temporary drive in the present example embodiment. FIG. 5 is a diagram showing power adjustment during the temporary drive.

Immediately after shifting to the temporary drive, the motor drive assembly 1000 temporarily maintains high power equivalent to the power in the normal drive. Then, the power is gradually reduced during continuation of the temporary drive to reach low power within the power upper limit in the recovery drive. Thereafter, the recovery drive is continued at the low power. By such power adjustment, a sudden change in power is avoided, and smooth driving of the motor 200 and smooth power assist in the power steering device are realized. Hereinafter, a method of selecting a drive pattern will be described in detail.

As described above, the control circuits 301 and 302 analyze potential detection values of the respective locations obtained from the potential sensors 411 to 417 during control in the normal state and response results of the switches obtained from the inverter drive circuits 311 and 312 and the switch drive circuits 313 and 314 to detect a sign of failure. In the present example embodiment, the detection locations of the potential detection values and the response results are associated with bits of the register, and the control circuits 301 and 302 set a bit corresponding to the location where an abnormality in the state value (for example, potential detection value or response result) is detected among the bits of the register. Then, the control circuits 301 and 302 execute an operation corresponding to the register value among a plurality of types of operations (drive patterns) as a failure operation (temporary drive). FIG. 6 is a diagram showing a correspondence relationship between abnormality detection and drive patterns.

The leftmost column of the correspondence table shown in FIG. 6 shows the detection conditions detected as abnormal state values by the control circuits 301 and 302. The detection conditions include a control response abnormality in the low-side switch element 114, a control response abnormality in the high-side switch element 113, a potential detection value abnormality (phase potential value abnormality) in each of the UVW phases, and response abnormalities other than those mentioned above (PrDr control abnormalities and others) in the inverter drive circuits 311 and 312. The detection conditions also include a potential detection value abnormality in the supply potential sensor 414 (VR value abnormality), and a current detection value abnormality (phase current value abnormality) in each of the UVW phases. The detection conditions also include a potential detection value abnormality (Vg value abnormality) in the ground potential sensor 416, and a potential detection value abnormality (Vn value abnormality) in the neutral point potential sensor 417.

As shown in the second column from the left of the correspondence table, the $0^{th}$ bit of the register is assigned to the control response abnormality in the low-side switch element 114. The first bit of the register is assigned to the control response abnormality in the high-side switch element 113. The second bit of the register is assigned to the potential detection value abnormality in each phase of UVW. The third bit of the register is assigned to the response abnormality other than those described above in the inverter drive circuits 311 and 312. The fourth bit of the register is assigned to the potential detection value abnormality in the supply potential sensor 414. The fifth bit of the register is assigned to the abnormal current detection value in each UVW phase. The sixth bit of the register is assigned to the potential detection value abnormality in the ground potential sensor 416. The seventh bit of the register is assigned to the potential detection value abnormality in the neutral point potential sensor 417.

In the motor drive assembly 1000 of the present example embodiment, seven types of failure patterns from pattern 0 to Pattern 6 are assumed as an example. Multiple failures with the same cause and circuit-symmetrical occurrences have the same failure pattern, and multiple failures with different causes or circuit-asymmetric occurrences have different failure patterns. The specific failure pattern will be described in detail later.

To each of the seven possible failure patterns, one of the Y1 drive, the Y3 drive, and the two-phase drive is assigned so that the use of the failed part is avoided. The top two rows of the correspondence table shown in FIG. 6 show the assignment of drive patterns to failure patterns.

The numerical value "1" shown in the correspondence table of FIG. 6 indicates an abnormality detected when a failure occurs in the assumed failure pattern, and the numerical value "0" indicates that the failure pattern and the abnormality do not correspond to each other. For example, in the case of Pattern 3, a control response abnormality in the low-side switch element 114 and a control response abnormality in the high-side switch element 113 are detected.

If an abnormality is detected in any of the detection conditions shown in the leftmost column of the correspondence table in FIG. 6, the allocation bit shown in the second column from the left of the correspondence table is set. When the register value is 31 or less, the Y1 drive is selected as the drive pattern for the temporary drive, and when the register value is 32 or more and 127 or less, the two-phase drive is selected as the drive pattern for the temporary drive, and when the register value is 128 or more, the Y3 drive is selected as the drive pattern for the temporary drive. By selecting the drive pattern by using the register in this way, the selection is performed in a shorter time than the selection by the flowchart. Since the control circuits 301 and 302 obtain the internal potentials of the inverters 111 and 112 under their control and the neutral point relay circuits 121 and 122 under the control of the other party, the drive pattern can be quickly selected, whereby a torque loss can be avoided.

Since the failure pattern can be identified from the detected abnormality by the correspondence relationship indicated by the numerical value "1" in the correspondence table of FIG. 6, a sign of failure can be detected by distinguishing each of the multiple types of failure patterns. When such detection of a sign of failure is performed, an operation (drive pattern) corresponding to the failure pattern is selected and executed from a plurality of types of operations (drive patterns).

Figure 7:
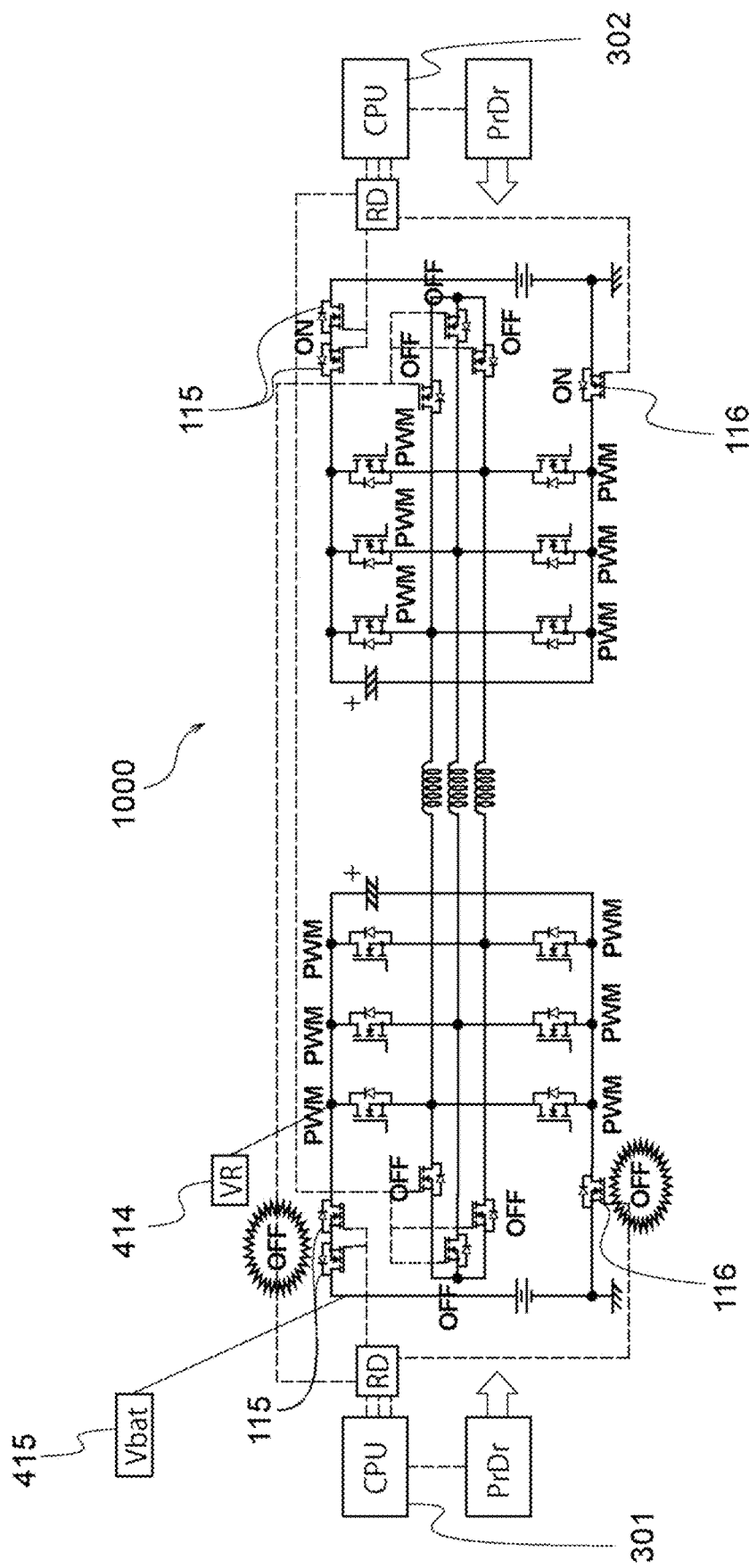
FIG. 7 is a diagram showing a state where Pattern 1 of a failure pattern occurs.

Of the detection conditions shown in the leftmost column of the correspondence table in FIG. 6, the detection conditions to which the $0^{th}$ to the fourth bits of the register are assigned are used for selecting a drive pattern and also used for detecting a sign of failure during the normal drive. That is, if an abnormality is detected during normal driving for any of the detection conditions to which the $0^{th}$ to the fourth bits of the register are assigned, it is assumed that a failure has occurred somewhere in the motor drive assembly 1000 so that it becomes a fire spread prevention state. Hereinafter, specific failure patterns will be illustrated, and the corresponding specific drive patterns will be described. FIG. 7 is a diagram showing a state in which Pattern 1 of the failure pattern occurs.

Figure 8:
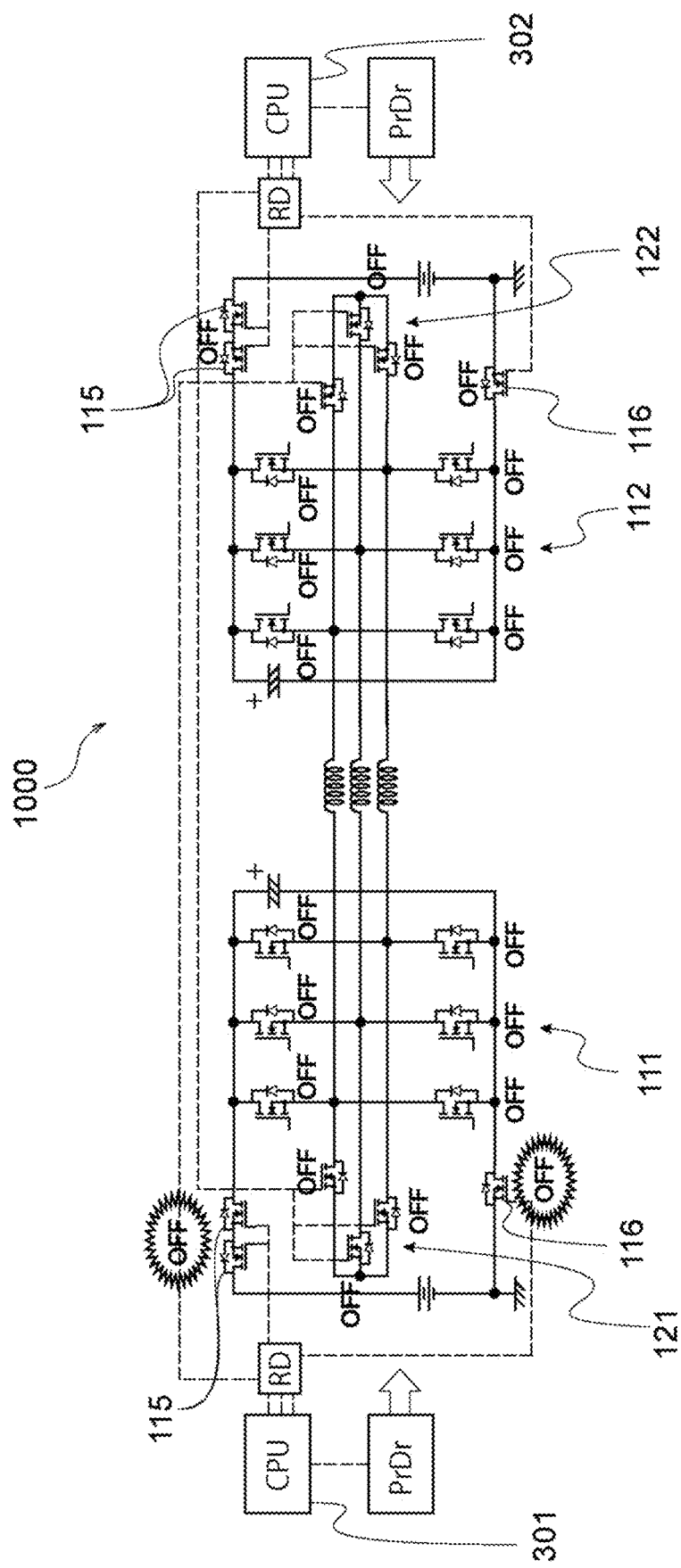
FIG. 8 is a diagram showing a state in which a fire spread prevention state has been entered.

In Pattern 1 of the failure pattern, an off-failure has occurred in any of the separation switches 115 and 116 of the motor drive assembly 1000. As shown in the correspondence table of FIG. 6, in Pattern 1, the potential detection value is abnormal in the supply potential sensor 414 of the system in which the separation switch 115 or 116 has failed. Further, although not shown in the correspondence table of FIG. 6, the potential detection value of the power source potential sensor 415 may be abnormal. When such an abnormality is detected by the analysis by the control circuits 301 and 302, the motor drive assembly 1000 shifts to the fire spread prevention state as described above. FIG. 8 is a diagram showing a state where the fire spread prevention state has been entered.

In the fire spread prevention state, all the switches are turned off in the inverters 111 and 112 of both systems included in the motor drive assembly 1000. In addition, all the separation switches 115 and 116 included in the motor drive assembly 1000 are also turned off. Further, regarding the neutral point relay circuits 121 and 122, all the switches are turned off by the control in the normal state, and all the switches remain off even in the fire spread prevention state.

Figure 9:
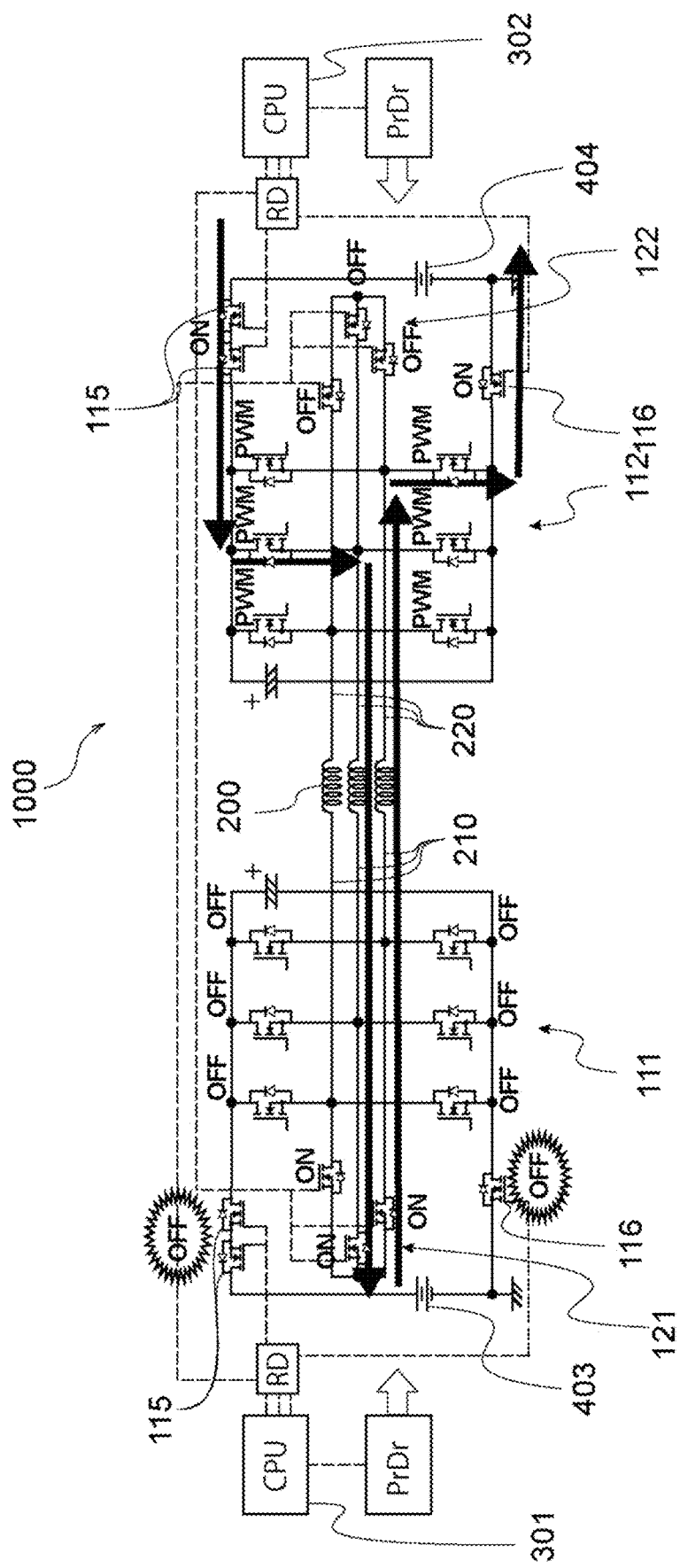
FIG. 9 is a diagram showing a state of temporary drive when the failure pattern is Pattern 1.

In such a fire spread prevention state, the control circuits 301 and 302 select the drive pattern for temporary drive as described above. When the failure pattern is Pattern 1, the Y1 drive is selected as a drive pattern as shown in FIG. 6. FIG. 9 is a diagram showing a state of temporary drive when the failure pattern is Pattern 1.

As described above, the motor drive assembly 1000 of the present example embodiment includes, as inverters, the inverter 111 of the first system connected to the one ends 210 of the windings of the motor 200 and the inverter 112 of the second system connected to the other ends 220 of the windings. When detecting a sign of failure in the drive system ranging from the power sources 403 and 404 to the motor 200, the control circuits 301 and 302 detect a sign of failure related to the inverter 111 of the first system and a sign of failure related to the inverter 112 of the second system in a distinguishable manner.

The Y1 drive is a drive pattern in which a neutral point is formed by the neutral point relay circuits 121 and 122, and when a failure occurs in the separation switches 115 and 116 that separate the inverter 111 of the first system, a neutral point is formed by the neutral point relay circuit 121 of the first system. Further, when a failure occurs in the separation switches 115 and 116 that separate the inverter 112 of the second system, a neutral point is formed by the neutral point relay circuit 122 of the second system. That is, the control circuits 301 and 302 select and execute an operation corresponding to the inverter 111 or 112 related to the failure from a plurality of types of operations as a failure operation (drive pattern for temporary drive).

If a sign of failure occurs in one of the circuit systems of the first system and the second system, the control circuit 301 or 302, of the control circuits 301 and 302, that controls the inverter 111 or 112 of the one of the circuit systems immediately selects the failure operation (drive pattern for temporary drive). Thereafter, the presence or absence of a failure in the circuit system is confirmed by the cooperation of the control circuits 301 and 302.

In the example shown in FIG. 9, since an off-failure occurs in the separation switches 115 and 116 of the first system, a neutral point is formed by the neutral point relay circuit 121 of the first system. When the neutral point is formed in this way, the control circuits 301 and 302 perform three-phase energization control by the normal inverter 112 of the second system, and continue driving of the motor 200.

Figure 10:
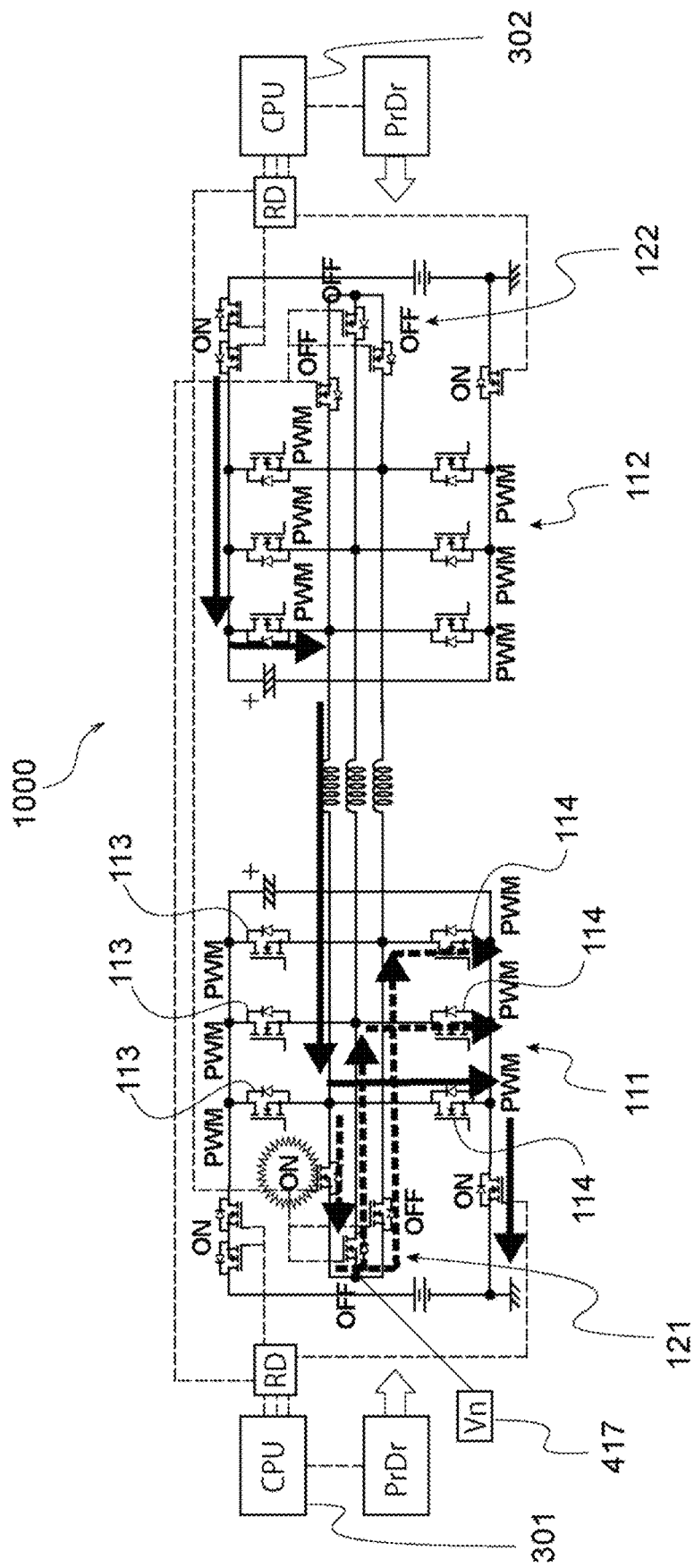
FIG. 10 is a diagram showing a state where Pattern 2 of a failure pattern occurs.

For the system in which a sign of failure was detected while driving the motor 200 by such temporary drive (for example, the first system in FIG. 9), the two separation switches 115 and 116 and the respective switches of the inverter 111 are individually controlled. Then, the presence or absence of a failure in each switch element is individually confirmed by the response results and the potential detection values. When the failed part is determined by such individual confirmation, recovery drive is performed with the same drive pattern as the drive pattern of the temporary drive (that is, the Y1 drive). Next, Pattern 2 of the failure pattern will be described. FIG. 10 is a diagram showing a state in which Pattern 2 of the failure pattern occurs.

In Pattern 2 of the failure pattern, an on-failure occurs in a switch element of the neutral point relay circuit 121 or 122 included in the motor drive assembly 1000. In the example shown in FIG. 10, an on-failure occurs in the switches in the neutral point relay circuit 121 of the first system. As shown in the correspondence table of FIG. 6, in Pattern 2, a control response abnormality in the low-side switch element 114 and a control response abnormality in the high-side switch element 113 occur.

Figure 11:
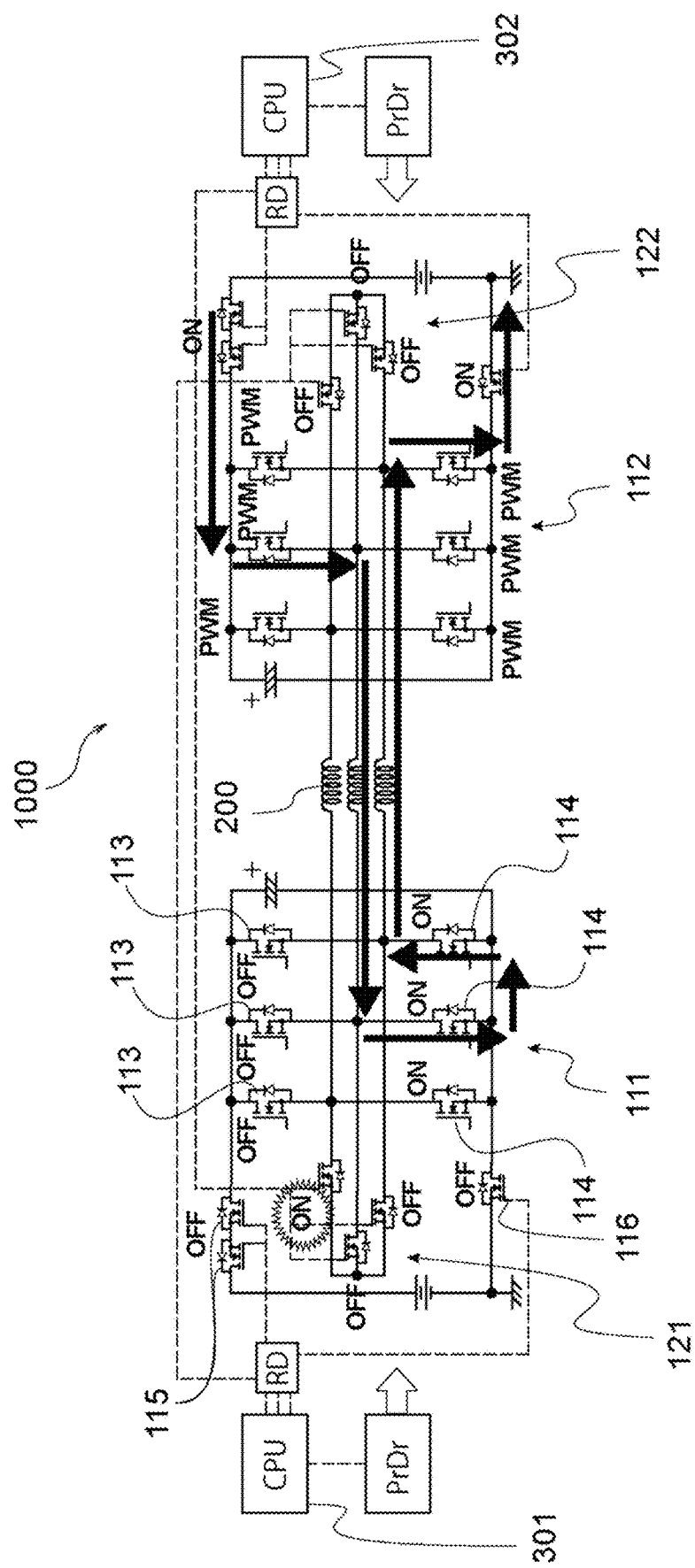
FIG. 11 is a diagram showing a state of temporary drive when the failure pattern is Pattern 2.

When such an abnormality is detected by the analysis by the control circuits 301 and 302, the motor drive assembly 1000 shifts to the fire spread prevention state. Then, in the fire spread prevention state, the control circuits 301 and 302 select a drive pattern for the temporary drive as described above. When the failure pattern is Pattern 2, the potential detection value is abnormal even in the neutral point potential sensor 417. Therefore, as shown in FIG. 6, the Y3 drive is selected as the drive pattern. FIG. 11 is a diagram showing a state of temporary drive when the failure pattern is Pattern 2.

The Y3 drive is a drive pattern in which a neutral point is formed in the inverter 111 or 112, and when an abnormality occurs in the potential detection value in the neutral point relay circuit 121 of the first system (that is, a sign of failure is detected in the first system), a neutral point is formed by the inverter 111 of the first system. Meanwhile, when an abnormality occurs in the potential detection value in the neutral point relay circuit 122 of the second system (that is, a sign of failure is detected in the second system), a neutral point is formed in the inverter 112 of the second system.

That is, when an abnormal internal potential is detected in the neutral point relay circuit 121 or 122 by the neutral point potential sensor 417, a neutral point is formed by the inverter 111 or 112 provided to the same circuit system as the neutral point relay circuit 121 or 122, and the operation shifts to the failure operation (drive pattern for temporary drive). Further, the separation switches 115 and 116 of the system in which the neutral point is formed are turned off, and the inverter 111 or 112 is separated from the power source and the ground.

As the neutral point formation in the inverters 111 and 112, neutral point formation in which the three high-side switches 113 are turned on and neutral point formation in which the three low-side switches 114 are turned on can be made. Since the low-side switch element 114 requires less power to maintain the on state than the high-side switch element, in the Y3 drive in the present example embodiment, the inverters 111 and 112 are neutralized by the low-side switch element 114 connected between the ground and the winding.

In the example shown in FIG. 11, since an on-failure occurs in the neutral point relay circuit 121 of the first system, a neutral point is formed in the inverter 111 of the first system. When the neutral point is formed in this way, the control circuits 301 and 302 perform three-phase energization control by the normal inverter 112 of the second system, and continue driving of the motor 200.

Figure 12:
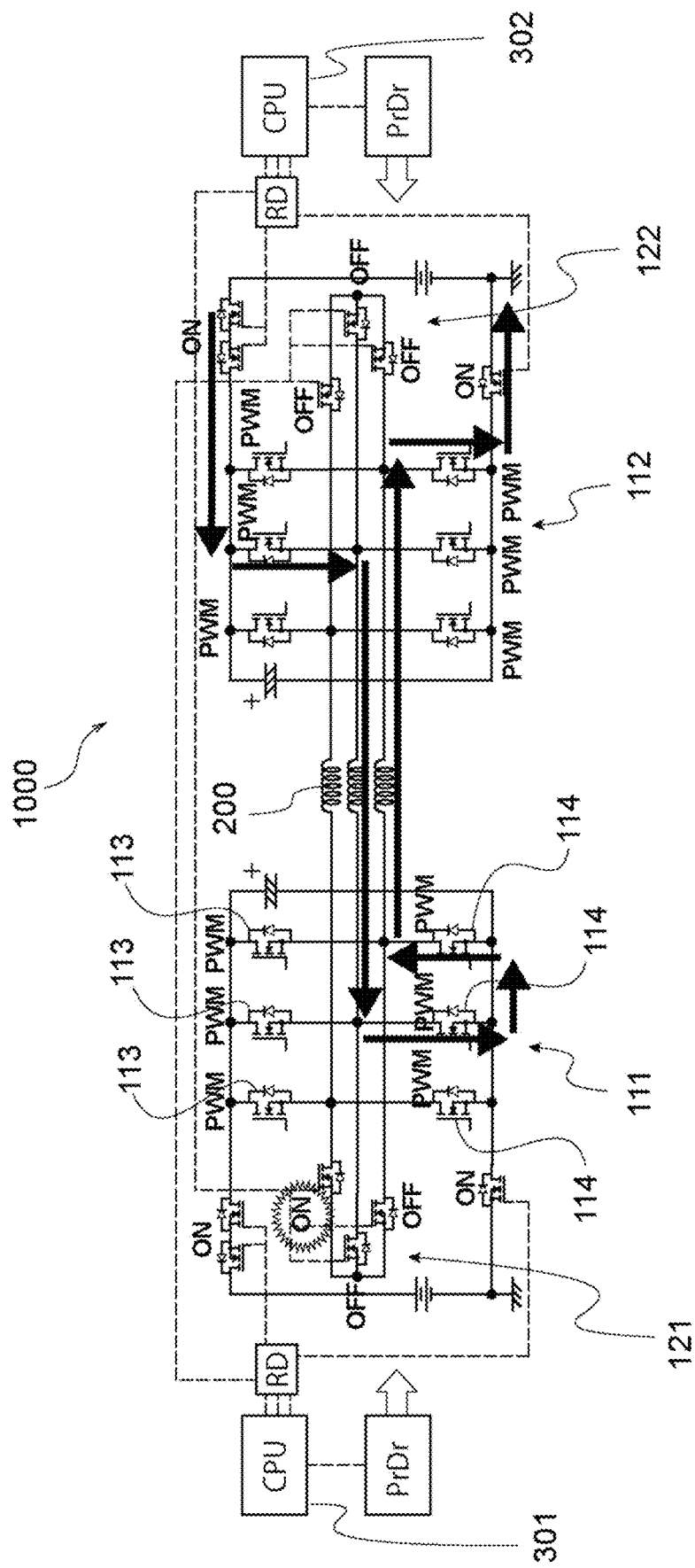
FIG. 12 is a diagram showing a modified example of neutral point formation in an inverter according to an example embodiment of the present invention.

During the drive of the motor 200 by such temporary drive, for the system in which a sign of failure is detected (for example, the first system in FIG. 11), the respective switches of the neutral point relay circuit 121 are controller individually. Then, the presence or absence of a failure in each switch element is individually confirmed by the response results and the potential detection values. When the failed part is determined by such individual confirmation, recovery drive is performed with the same drive pattern as the drive pattern for the temporary drive (that is, the Y3 drive). The following modified examples can be considered for neutral point formation in the inverters 111 and 112. FIG. 12 is a diagram showing a modified example of neutral point formation in the inverters 111 and 112.

Figure 13:
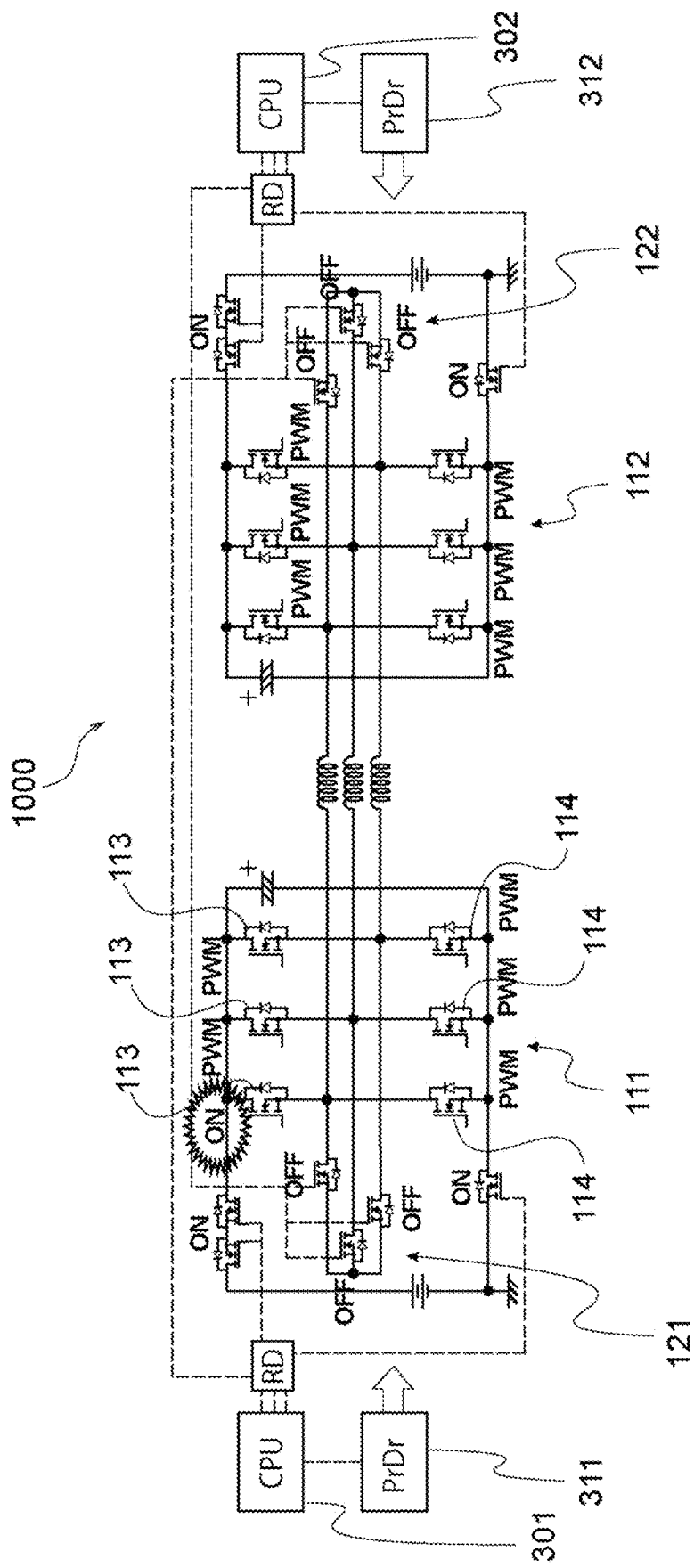
FIG. 13 is a diagram showing a state where Pattern 3 of a failure pattern occurs.

Also in the modified example shown in FIG. 12, an abnormality occurs in the potential detection value in the neutral point relay circuit 121 of the first system, and a neutral point is formed in the inverter 111 of the first system. However, neither the high-side switch element 113 nor the low-side switch element 114 of the inverter 111 is fixed in the on state, and the potential at the neutral point is controlled by the PWM control. Next, Pattern 3 of the failure pattern will be described. FIG. 13 is a diagram showing a state in which Pattern 3 of the failure pattern occurs.

In Pattern 3 of the failure pattern, an on-failure occurs in a switch element of the inverter 111 or 112 included in the motor drive assembly 1000. In the example shown in FIG. 13, an on-failure occurs in the inverter 111 of the first system, and an on-failure occurs in one of the high-side switches 113. As shown in the correspondence table of FIG. 6, in Pattern 3, a control response abnormality in the low-side switch element 114 or a control response abnormality in the high-side switch element 113 occurs.

When such an abnormality is detected by the control circuits 301 and 302 via the inverter drive circuits 311 and 312, the motor drive assembly 1000 shifts to the fire spread prevention state. Then, in the fire spread prevention state, the control circuits 301 and 302 select a drive pattern for the temporary drive as described above. When the failure pattern is Pattern 3, the Y1 drive is selected as the drive pattern as shown in FIG. 6.

Figure 14:
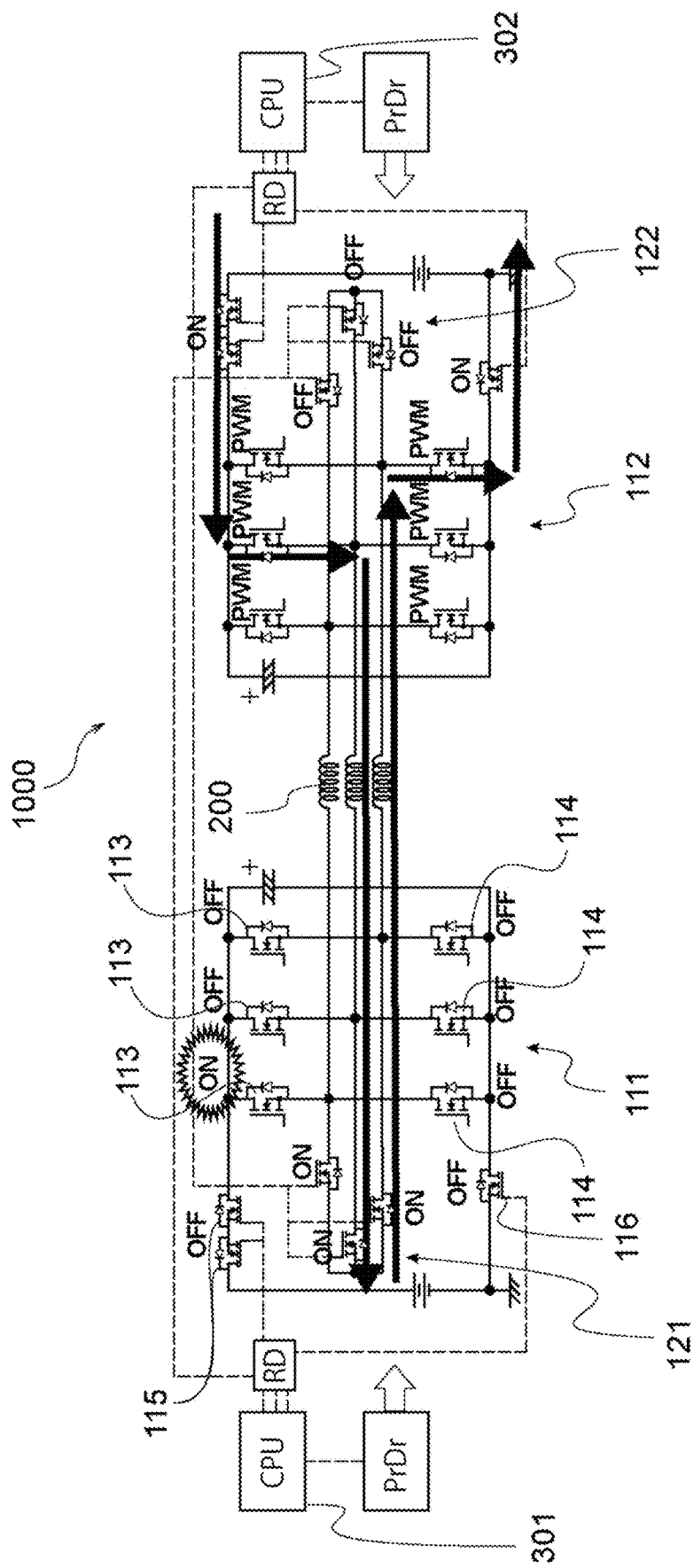
FIG. 14 is a diagram showing a state of temporary drive when the failure pattern is Pattern 3.

Since the motor drive assembly 1000 is provided with the neutral point potential sensor 417 as a potential sensor, the control circuits 301 and 302 can distinguish between Pattern 2 and Pattern 3 at the stage of selecting the drive pattern. As a result, an appropriate drive pattern can be selected from the Y1 drive and the Y3 drive as the temporary drive. FIG. 14 is a diagram showing a state of temporary drive when the failure pattern is Pattern 3.

As described above, the Y1 drive is a drive pattern in which a neutral point is formed by the neutral point relay circuit 121 or 122, and when a failure occurs in the inverter 111 of the first system, a neutral point is formed by the neutral point relay circuit 121 of the first system. Further, when a failure occurs in the inverter 112 of the second system, a neutral point is formed by the neutral point relay circuit 122 of the second system. Further, the separation switches 115 and 116 of the system in which the neutral point is formed are turned off, and the inverter 111 or 112 is separated from the power source and the ground.

In the example shown in FIG. 14, since an on-failure occurs in a switch element in the inverter 111 of the first system, a neutral point is formed by the neutral point relay circuit 121 of the first system. When the neutral point is formed in this way, the control circuits 301 and 302 perform three-phase energization control by the normal inverter 112 of the second system, and continue driving of the motor 200.

Figure 15:
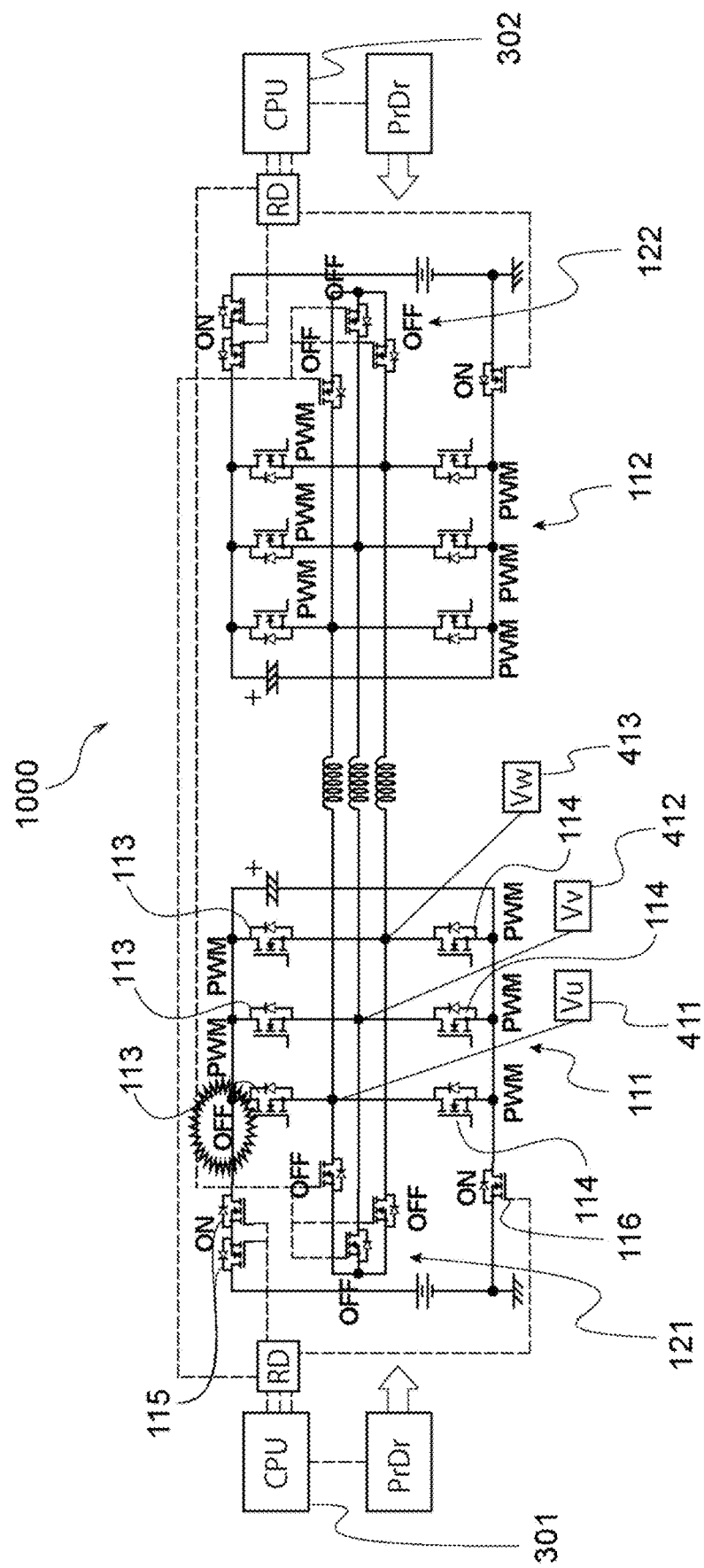
FIG. 15 is a diagram showing a state where Pattern 4 of a failure pattern occurs.

During the drive of the motor 200 by such temporary drive, for the system in which a sign of failure is detected (for example, first system in FIG. 14), respective switches in the inverter 111 are individually controlled. Then, the presence or absence of a failure in each switch element is individually confirmed by the response results and the potential detection values. That is, as confirmation of the presence or absence of a failure, the control circuits 301 and 302 individually confirm the presence or absence of a failure in the plurality of switches in the inverter 111. When the failed part is determined by such individual confirmation, recovery drive is performed with the same drive pattern as the drive pattern of the temporary drive (that is, the Y1 drive). Next, Pattern 4 of the failure pattern will be described. FIG. 15 is a diagram showing a state in which Pattern 4 of the failure pattern occurs.

In Pattern 4 of the failure pattern, an off-failure occurs in a switch element of the inverter 111 or 112 included in the motor drive assembly 1000. In the example shown in FIG. 15, an off-failure occurs in the inverter 111 of the first system, and an off-failure occurs in one of the high-side switches 113. As shown in the correspondence table of FIG. 6, in Pattern 4, an abnormality occurs in the potential direction value of a potential sensor of the phase in which an off-failure has occurred, among the U-phase potential sensor 411, the V-phase potential sensor 412, and the W-phase potential sensor 413. In the example shown in FIG. 15, an abnormality occurs in the potential detection value of the U phase.

Figure 16:
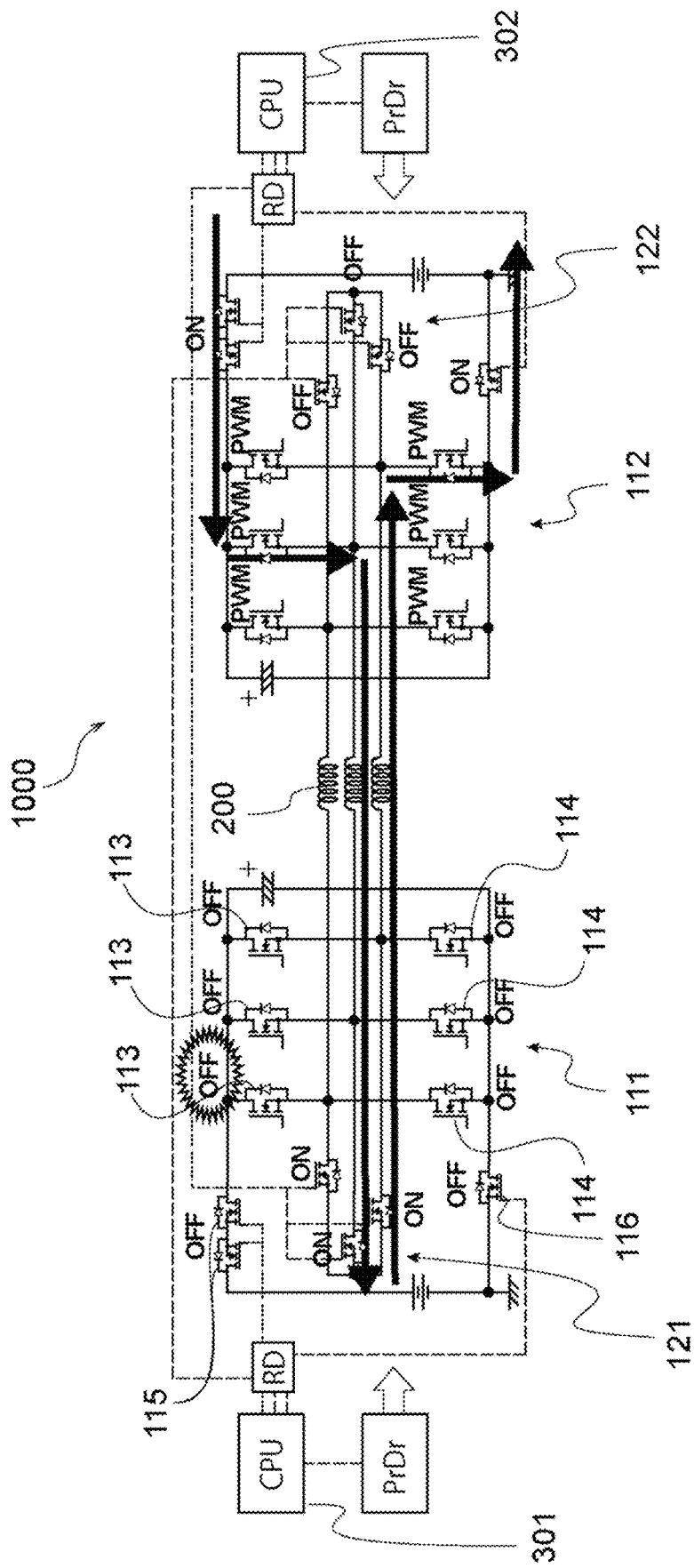
FIG. 16 is a diagram showing a state of temporary drive when the failure pattern is Pattern 4.

When such an abnormality is detected by the control circuits 301 and 302, the motor drive assembly 1000 shifts to the fire spread prevention state. Then, in the fire spread prevention state, the control circuits 301 and 302 select a drive pattern for the temporary drive as described above. When the failure pattern is Pattern 4, the Y1 drive is selected as the drive pattern, as shown in FIG. 6. FIG. 16 is a diagram showing a state of temporary drive when the failure pattern is Pattern 4.

As described above, the Y1 drive is a drive pattern in which a neutral point is formed by the neutral point relay circuit 121 or 122, and when a failure occurs in the inverter 111 of the first system, a neutral point is formed by the neutral point relay circuit 121 of the first system. Further, when a failure occurs in the inverter 112 of the second system, a neutral point is formed by the neutral point relay circuit 122 of the second system. That is, when the abnormal internal potential in the inverter 111 or 112 is detected by the potential sensors 411 to 413, a neutral point is formed by the neutral point relay circuits 121 or 122 provided in the same circuit system as such inverter 111 or 112, and the operation shifts to the failure operation (drive pattern for temporary drive). Further, the separation switches 115 and 116 of the system in which the neutral point is formed are turned off, and the inverter 111 or 112 is separated from the power source and the ground.

In the example shown in FIG. 16, since an off-failure occurs in a switch element of the inverter 111 of the first system, the neutral point is formed by the neutral point relay circuit 121 of the first system. When the neutral point is formed in this way, the control circuits 301 and 302 perform three-phase energization control by the normal inverter 112 of the second system, and continue driving of the motor 200.

Figure 17:
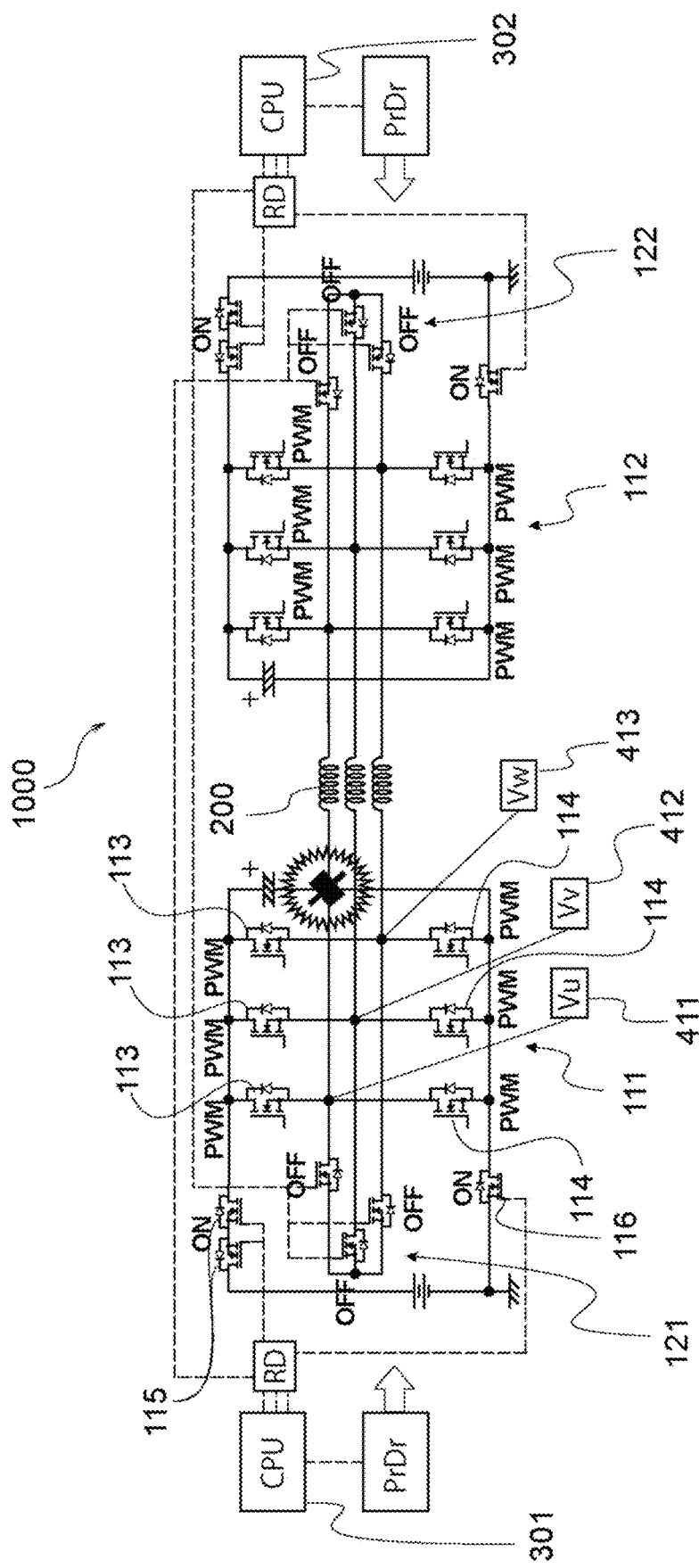
FIG. 17 is a diagram showing a state where Pattern 5 of a failure pattern occurs.

During the drive of the motor 200 by such temporary drive, for the system in which a sign of failure is detected (for example, first system in FIG. 16), respective switches in the inverter 111 are individually controlled. Then, the presence or absence of a failure in each switch element is individually confirmed by the response results and the potential detection values. That is, as confirmation of the presence or absence of a failure, the control circuits 301 and 302 individually confirm the presence or absence of a failure in the plurality of switches in the inverter 111. When the failed part is determined by such individual confirmation, recovery drive is performed with the same drive pattern as the drive pattern of the temporary drive (that is, the Y1 drive). Next, Pattern 5 of the failure pattern will be described. FIG. 17 is a diagram showing a state in which Pattern 5 of the failure pattern occurs.

In Pattern 5 of the failure pattern, a disconnection failure occurs in a winding of the motor 200. In the example shown in FIG. 17, a disconnection failure occurs in the U-phase winding among the windings of the motor 200. As shown in the correspondence table of FIG. 6, in Pattern 5, an abnormality occurs in the potential detection value in a potential sensor of the phase in which the disconnection failure occurs, among the U-phase potential sensor 411, the V-phase potential sensor 412, and the W-phase potential sensor 413.

Figure 18:
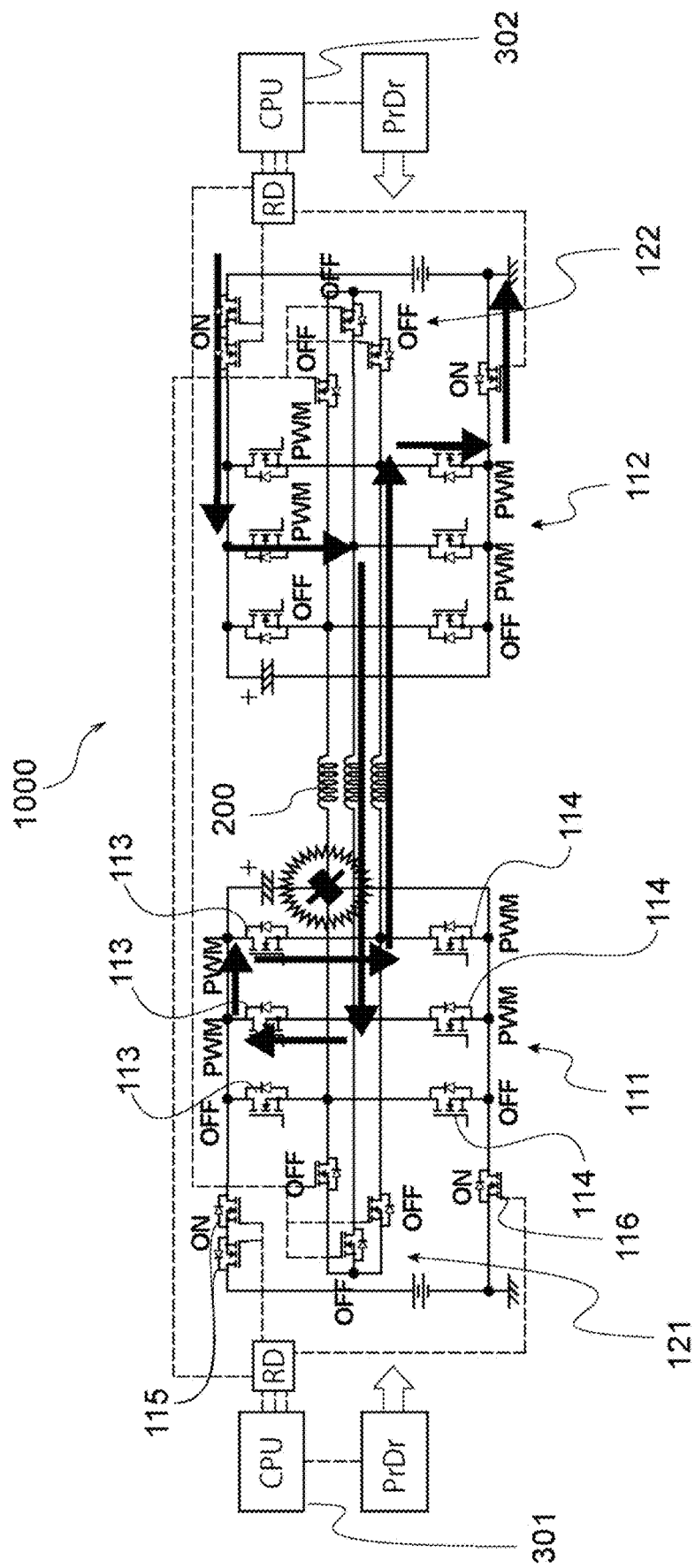
FIG. 18 is a diagram showing a state of temporary drive when the failure pattern is Pattern 5.

When such an abnormality is detected by the control circuits 301 and 302, the motor drive assembly 1000 shifts to the fire spread prevention state. Then, in the fire spread prevention state, the control circuits 301 and 302 select a drive pattern for the temporary drive as described above. When the failure pattern is Pattern 5, the current detection value is also abnormal (current zero) for the phase in which the disconnection failure has occurred among the UVW phases. Therefore, as shown in FIG. 6, the two-phase drive is selected as a drive pattern. FIG. 18 is a diagram showing a state of temporary drive when the failure pattern is Pattern 5.

The two-phase drive is a drive pattern in which only two of the UVW phases are used. Two phases excluding the phase in which the disconnection failure has occurred is used. If a disconnection failure occurs in the U-phase winding, two phases, namely V-phase and W-phase, are used, if a disconnection failure occurs in the V-phase winding, two phases, namely U-phase and W-phase, are used, and if a disconnection failure occurs in the W phase winding, two phases, namely U phase and V phase, are used. That is, when detecting a sign of failure in the drive system ranging from the power sources 403 and 404 to the motor 200, the control circuits 301 and 302 distinguishingly detect the sign of failure related to each phase of the motor 200. Then, the control circuits 301 and 302 select and execute an operation corresponding to the phase related to the failure from a plurality of types of operations as the failure operation.

Figure 19:
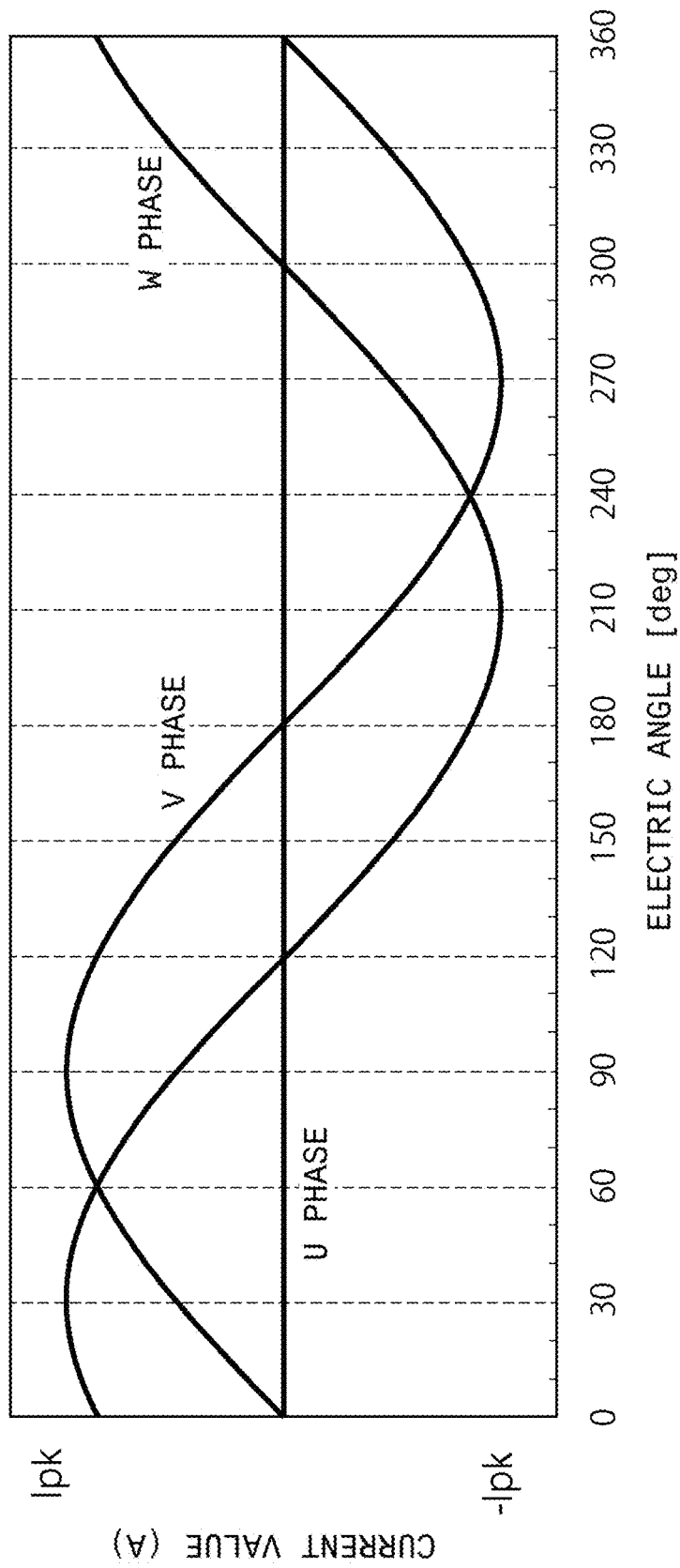
FIG. 19 is a diagram showing current values flowing through the coils of respective phases of a motor in a two-phase drive.

In the example shown in FIG. 18, since a disconnection failure occurs in the U-phase winding, the control circuits 301 and 302 perform drive control by two phases namely V phase and W phase while avoiding the use of U phase to continue driving of the motor 200. FIG. 19 is a diagram showing current values flowing through the respective coils of the respective phases of the motor 200 in the two-phase drive. In the two-phase drive, the current value is always zero in, for example, the U phase in which a sign of failure is detected, and the current flows in the other two phases namely V phase and W phase in, for example, a sinusoidal current waveform.

Figure 20:
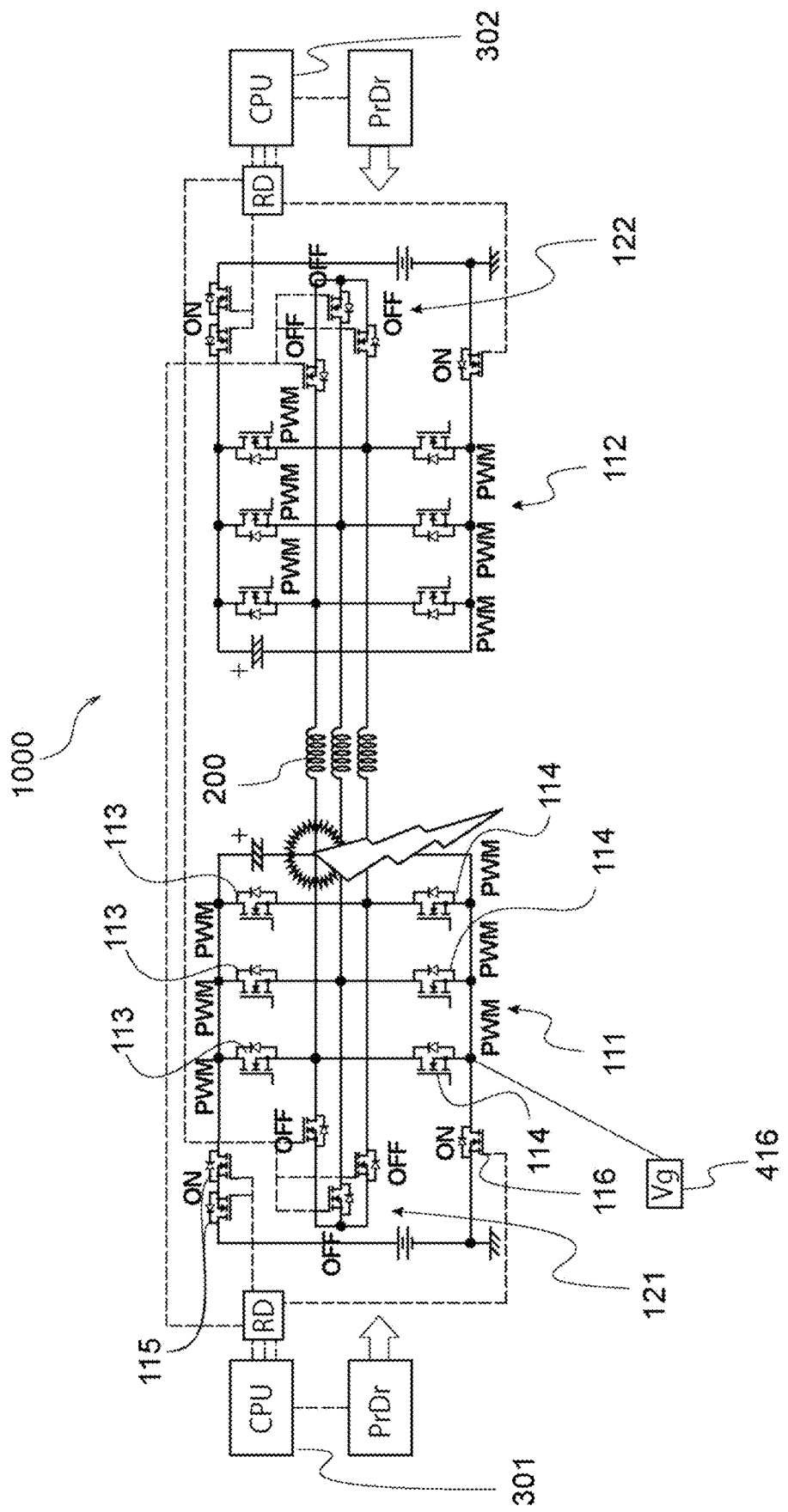
FIG. 20 is a diagram showing a state where Pattern 6 of a failure pattern occurs.

During driving of the motor 200 by such temporary drive, for the phase in which a sign of failure is detected (U phase in FIG. 18 as an example), the current detection value is analyzed again, and the presence or absence of a disconnection failure is confirmed. When the existence of a disconnection failure is confirmed by such reanalysis, recovery drive is performed with the same drive pattern as the drive pattern for the temporary drive (that is, the two-phase drive). Next, Pattern 6 of the failure pattern will be described. FIG. 20 is a diagram showing a state in which Pattern 6 of the failure pattern occurs.

In Pattern 6 of the failure pattern, a short-circuit failure with the ground occurs in a winding of the motor 200. In the example shown in FIG. 20, a short-circuit failure occurs in the U-phase winding among the windings of the motor 200. As shown in the correspondence table of FIG. 6, in Pattern 6, a control response abnormality occurs in the high-side switch element 113.

Figure 21:
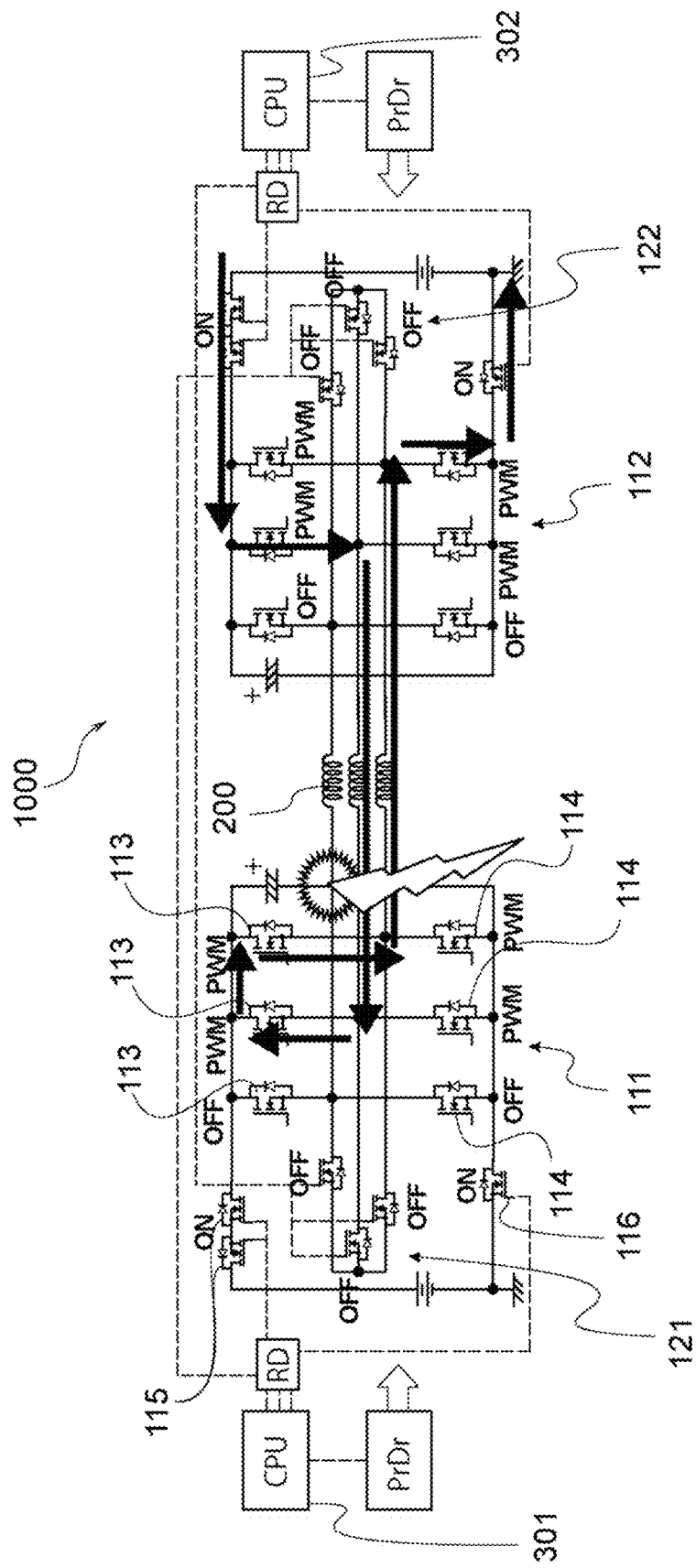
FIG. 21 is a diagram showing a state of temporary drive when the failure pattern is Pattern 6.

When such an abnormality is detected by the control circuits 301 and 302, the motor drive assembly 1000 shifts to the fire spread prevention state. Then, in the fire spread prevention state, the control circuits 301 and 302 select a drive pattern for the temporary drive as described above. When the failure pattern is Pattern 6, an abnormality also occurs in the potential detection value of the ground potential sensor 416. Therefore, as shown in FIG. 6, the two-phase drive is selected as the drive pattern. FIG. 21 is a diagram showing a state of temporary drive when the failure pattern is Pattern 6.

As described above, the two-phase drive is a drive pattern in which only two of the UVW phases are used. Two phases excluding the phase in which the disconnection failure has occurred is used. In the example shown in FIG. 21, since a disconnection failure occurs in the U-phase winding, the control circuits 301 and 302 perform drive control using the two phases namely V phase and W phase while avoiding the use of U phase to continue driving of the motor 200.

During driving of the motor 200 by such temporary drive, the control circuits 301 and 302 perform temporary energization control in the phase in which a sign of failure is detected (U phase in FIG. 21 as an example) or the like to check the potential detection value of the ground potential sensor 416 when the phase is energized. By confirming such a potential detection value, the presence or absence of a short-circuit failure in the relevant phase is confirmed. When the existence of a short-circuit failure is confirmed, recovery drive is performed with the same drive pattern as the drive pattern for the temporary drive (that is, the two-phase drive).

In addition to the failure patterns described above, in the present example embodiment, a failure pattern in which one of the two control circuits 301 and 302 fails is also assumed. In this failure pattern, a failure is detected when one control circuit cannot obtain a communication response from the other control circuit. Then, in this failure pattern, assuming that the inverter on the other side becomes uncontrollable, a neutral point is formed by the neutral point relay circuit 121 or 122 of the other side system, and temporary drive is performed by the Y1 drive. That is, the control circuits 301 and 302 communicate with each other, and when one of them detects that the other cannot communicate, the one allows the neutral point relay circuit 121 or 122 controlled by itself to form a neutral point, and the operation shifts to the failure operation (drive pattern for temporary drive).

Figure 22:
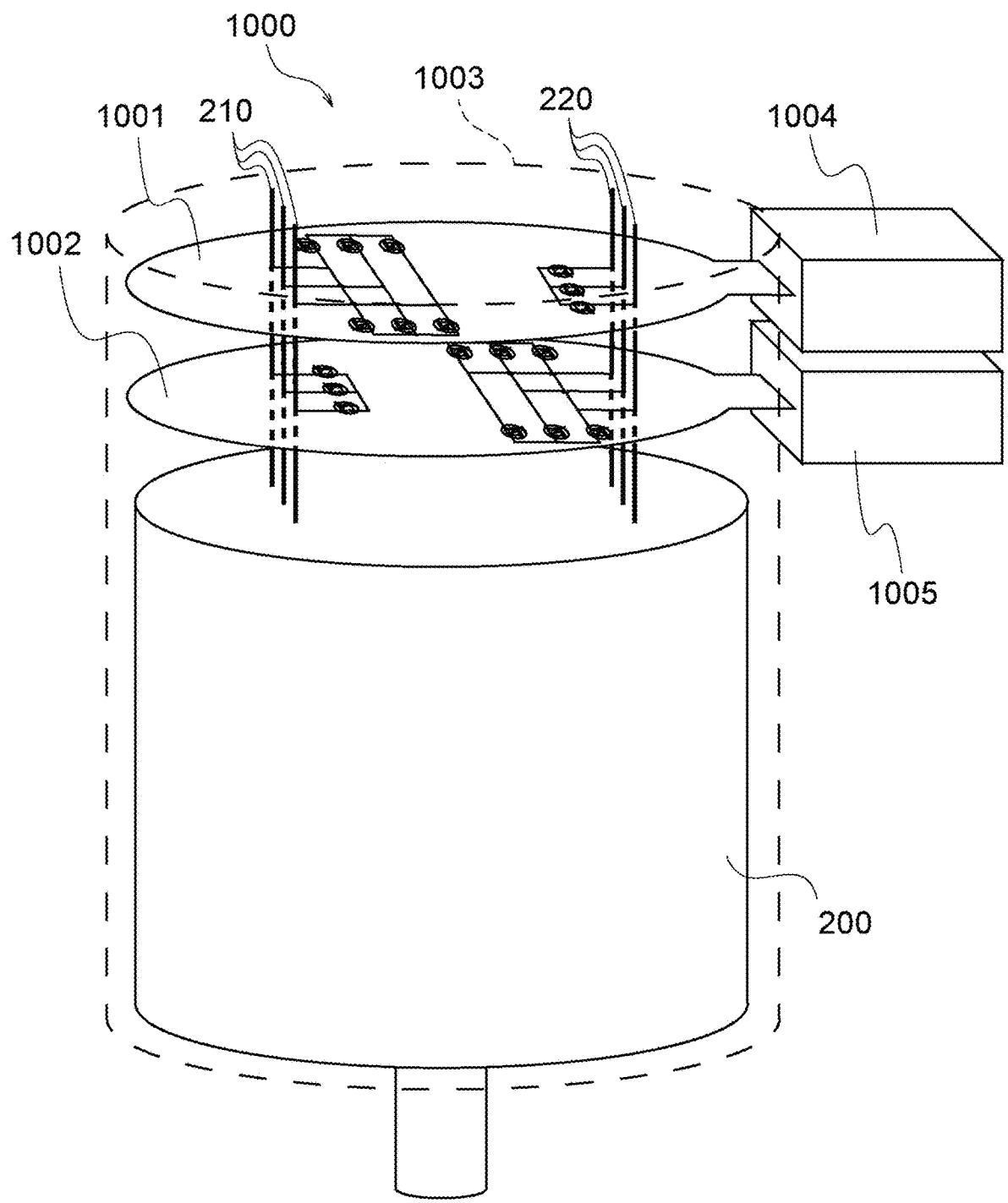
FIG. 22 is a diagram schematically showing a hardware configuration of a motor drive assembly according to an example embodiment of the present invention.

In the above example embodiment, the two control circuits 301 and 302 control the inverters 111 and 112 and detect a failure. However, the controller according to the present disclosure may be, for example, one CPU. Next, the hardware configuration of the motor drive assembly 1000 will be described. FIG. 22 is a diagram schematically showing a hardware configuration of the motor drive assembly 1000.

The motor drive assembly 1000 includes the above-mentioned motor 200, a first mounting board 1001, a second mounting board 1002, a housing 1003, and connectors 1004 and 1005, as the hardware configuration.

From the motor 200, the one ends 210 and the other ends 220 of the coils protrude and extend toward the mounting boards 1001 and 1002. Both the one ends 210 and the other ends 220 of the coils are connected to one of the first mounting board 1001 and the second mounting board 1002, and both the one ends 210 and the other ends 220 penetrate the one of the first mounting board 1001 and the second mounting board 1002 and are connected to the other. Specifically, both the one ends 210 and the other ends 220 of the coils are connected to, for example, the second mounting board 1002. Further, both the one ends 210 and the other ends 220 of the coils penetrate the second mounting board 1002 and are connected to the first mounting board 1001.

The board surfaces of the first mounting board 1001 and the second mounting board 1002 face each other. The rotation axis of the motor 200 extends in the direction in which the substrate surfaces face each other. The positions of the first mounting board 1001 and the second mounting board 1002 and the motor 200 are fixed to each other by being housed in the housing 1003.

Figure 23:
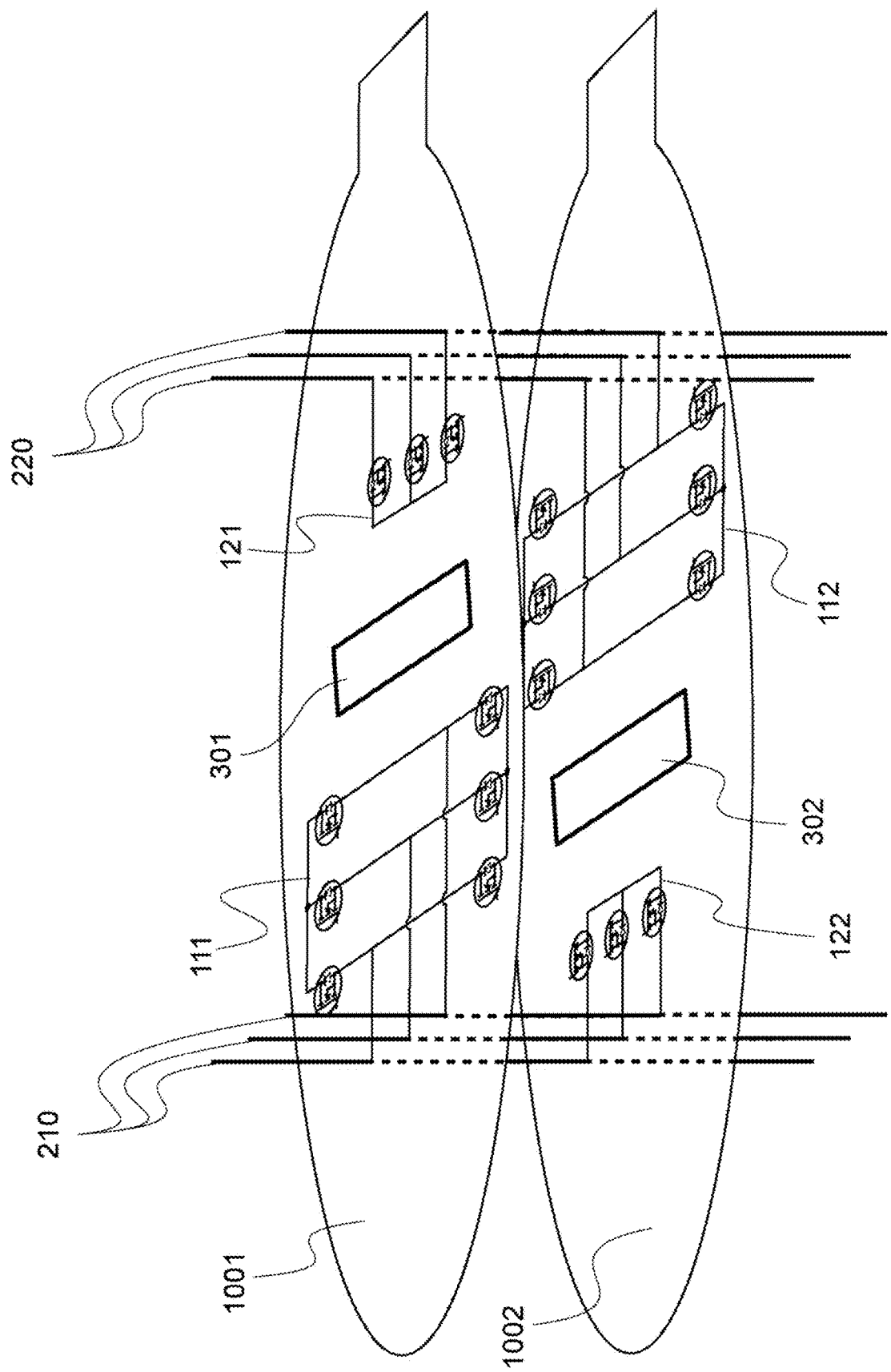
FIG. 23 is a diagram schematically showing a hardware configuration of a first mounting board and a second mounting board according to an example embodiment of the present invention.

A connector 1004 to which the power cord from the first power source 403 is connected is attached to the first mounting board 1001. A connector 1005 to which the power cord from the second power source 404 is connected is attached to the second mounting board 1002. FIG. 23 is a diagram schematically showing the hardware configuration of the first mounting board 1001 and the second mounting board 1002.

On the first mounting board 1001, the first inverter 111 on the one ends 210 side of the coils and the second neutral point relay circuit 121 on the other ends 220 side are mounted. Further, on the second mounting board 1002 which is different from the first mounting board 1001, the second inverter 112 on the other ends 220 side of the coils and the first neutral point relay circuit 122 on the one ends 210 side are mounted. Since the circuits of the respective systems that are redundant in the first system and the second system are distributed to the two mounting boards 1001 and 1002, it is possible to realize efficient element arrangement with the same circuit scale in the two mounting boards.

On the first mounting board 1001, the first control circuit 301 is also mounted. On the second mounting board 1002, the second control circuit 302 is also mounted. Since the control circuits 301 and 302 are mounted on the same mounting boards as the inverters 111 and 112 and the neutral point relay circuits 121 and 122 that are controlled by the control circuits 301 and 302, the wirings for control are placed within the board. Therefore, efficient element arrangement is possible.

The first inverter 111 on the first mounting board 1001 and the first neutral point relay circuit 122 on the second mounting board 1002 are mounted at positions where they overlap each other when viewed in a direction in which the first mounting board 1001 and the second mounting board 1002 oppose each other. Further, the second neutral point relay circuit 121 on the first mounting board 1001 and the second inverter 112 on the second mounting board 1002 are mounted at positions where they overlap with each other when viewed in a direction in which the first mounting board 1001 and the second mounting board 1002 oppose each other. Such a circuit arrangement enables an efficient element arrangement in which the wiring paths for the one ends 210 and the other ends 220 of the coils are simplified.

Figure 24:
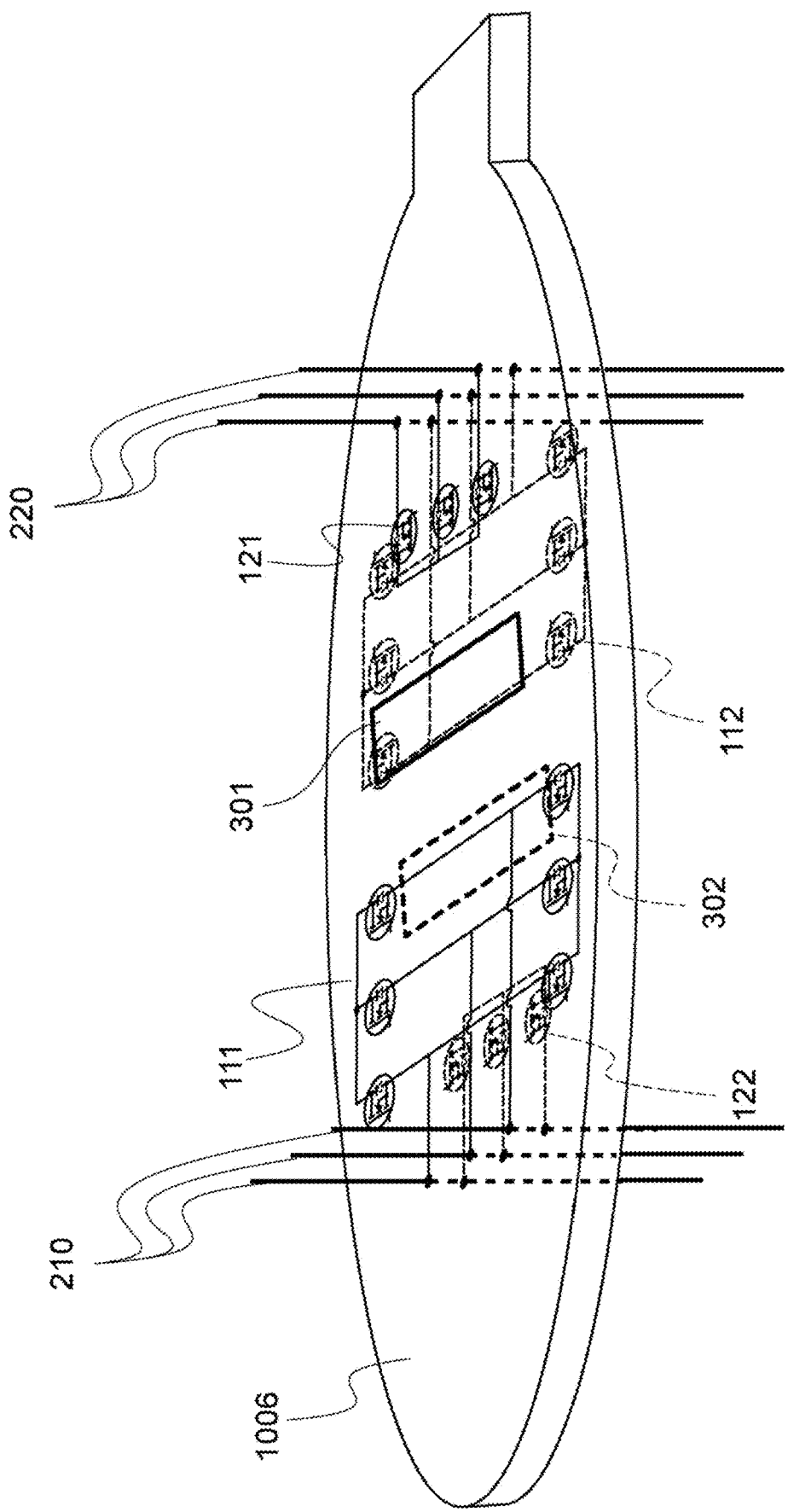
FIG. 24 is a diagram schematically showing a modified example of a hardware configuration of a mounting board according to an example embodiment of the present invention.

When viewed in the direction in which the first mounting board 1001 and the second mounting board 1002 oppose each other, the first inverter 111 on the first mounting board 1001 and the second inverter 112 on the second mounting board 1002 are arranged symmetrically with each other. Further, when viewed in the direction in which the first mounting board 1001 and the second mounting board 1002 oppose each other, the second neutral point relay circuit 121 on the first mounting board 1001 and the first neutral point relay circuit 122 on the second mounting board 1002 are arranged symmetrically with each other. With such a symmetrical arrangement, the board design can be standardized for the two mounting boards 1001 and 1002. FIG. 24 is a diagram schematically showing a modified example of the hardware configuration of the mounting board.

In the modified example shown in FIG. 24, one double-sided mounting board 1006 is provided. On one surface of the front and back surfaces of the double-sided mounting board 1006, the first inverter 111 on the one ends 210 side of the coils and the second neutral point relay circuit 121 on the other ends 220 side of the coils are mounted. On the other surface with respect to the one surface, the second inverter 112 on the other ends 220 side of the coils and the first neutral point relay circuit 122 on the one ends 210 side of the coils are mounted. The first control circuit 301 is also mounted on the one surface of the front and back surfaces. The second control circuit 302 is also mounted on the other surface. Since the circuits of the respective systems that are redundant in the first system and the second system are distributed to both the front and back surfaces of the double-sided mounting board, it is possible to efficiently arrange the elements with the circuit scale leveled on both the front and back surfaces.

The specific circuit layout on both the front and back sides of the double-sided mounting board 1006 is that the circuit layout on one side is the same as the circuit layout on the first mounting board 1001 shown in FIG. 23, and the circuit layout on the other side is the same as the circuit layout on the second mounting board 1002 shown in FIG. 23. Therefore, it is possible to efficiently arrange the elements by simplifying the wiring paths for the one ends 210 and the other ends 220 of the coils, and it is possible to standardize the board design on both the front and back sides of the double-sided mounting board 1006.

Vehicles such as automobiles are generally equipped with a power steering device. A power steering device generates an auxiliary torque for assisting the steering torque of the steering system generated by the driver operating the steering handle. The auxiliary torque is generated by the auxiliary torque mechanism, and the burden on the driver's operation can be reduced. For example, the auxiliary torque mechanism includes a steering torque sensor, an ECU, a motor, a reduction mechanism, and the like. The steering torque sensor detects the steering torque in the steering system. The ECU generates a drive signal based on the detection signal of the steering torque sensor. The motor generates an auxiliary torque according to the steering torque based on the drive signal, and transmits the auxiliary torque to the steering system via the reduction mechanism.

Figure 25:
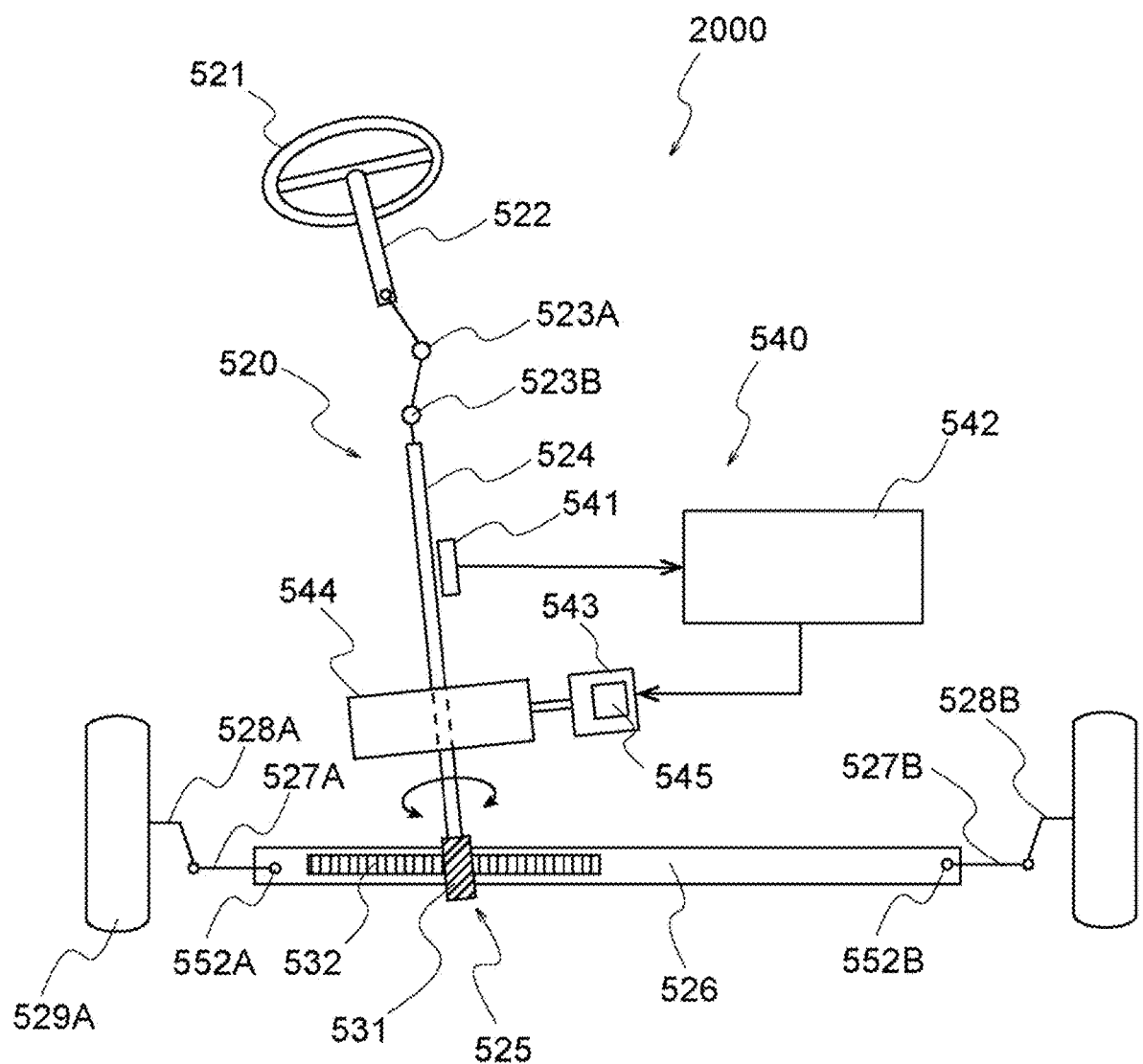
FIG. 25 is a diagram schematically showing a configuration of a power steering device according to an example embodiment of the present invention.

The motor drive assembly 1000 of the above example embodiment is suitably used for a power steering device. FIG. 25 is a diagram schematically showing the configuration of a power steering device 2000 according to the present example embodiment. The electric power steering device 2000 includes a steering system 520 and an auxiliary torque mechanism 540.

The steering system 520 includes, for example, a steering handle 521, a steering shaft 522 (also referred to as a "steering column"), free shaft joints 523A and 523B, and a rotating shaft 524 (also referred to as a "pinion shaft" or "input shaft").

The steering system 520 also includes, for example, a rack and pinion mechanism 525, a rack shaft 526, left and right ball joints 552A and 552B, tie rods 527A and 527B, knuckles 528A and 528B, and left and right steering wheels (for example, left and right front wheels) 529A and 529B.

The steering handle 521 is connected to the rotating shaft 524 via the steering shaft 522 and the free shaft joints 523A and 523B. The rack shaft 526 is connected to the rotating shaft 524 via the rack and pinion mechanism 525. The rack and pinion mechanism 525 has a pinion 531 provided to the rotating shaft 524 and a rack 532 provided to the rack shaft 526. The right steering wheel 529A is connected to the right end of the rack shaft 526 via the ball joint 552A, the tie rod 527A and the knuckle 528A in this order. Similar to the right side, the left steering wheel 529B is connected to the left end of the rack shaft 526 via the ball joint 552B, the tie rod 527B and the knuckle 528B in this order. Here, the right side and the left side correspond to the right side and the left side as seen from the driver sitting on the seat, respectively.

According to the steering system 520, steering torque is generated when the driver operates the steering handle 521, and is transmitted to the left and right steering wheels 529A and 529B via the rack and pinion mechanism 525. As a result, the driver can operate the left and right steering wheels 529A and 529B.

The auxiliary torque mechanism 540 includes, for example, a steering torque sensor 541, an ECU 542, a motor 543, a speed reduction mechanism 544, and a power supply device 545. The auxiliary torque mechanism 540 applies auxiliary torque to the steering system 520 from the steering handle 521 to the left and right steering wheels 529A and 529B. The auxiliary torque is sometimes referred to as "additional torque".

As the ECU 542, for example, the control circuits 301 and 302 shown in FIG. 1 and elsewhere are used. Further, as the power supply device 545, for example, the inverters 111 and 112 shown in FIG. 1 and elsewhere are used. Further, as the motor 543, for example, the motor 200 shown in FIG. 1 and elsewhere is used. When the ECU 542, the motor 543, and the power supply device 545 constitute a unit generally referred to as a "mechanical-electric integrated motor", as the unit, the motor drive assembly 1000 having the hardware configuration shown in FIG. 22 is preferably used, for example. Of the elements shown in FIG. 25, the mechanism configured of the elements excluding the ECU 542, the motor 543, and the power supply device 545 corresponds to an example of the power steering mechanism driven by the motor 543.

The steering torque sensor 541 detects the steering torque of the steering system 520 applied by the steering handle 521. The ECU 542 generates a drive signal for driving the motor 543 based on a detection signal from the steering torque sensor 541 (hereinafter, referred to as a "torque signal"). The motor 543 generates an auxiliary torque according to the steering torque based on the drive signal. The auxiliary torque is transmitted to the rotating shaft 524 of the steering system 520 via the speed reduction mechanism 544. The speed reduction mechanism 544 is, for example, a worm gear mechanism. Auxiliary torque is further transmitted from the rotating shaft 524 to the rack and pinion mechanism 525.

The power steering device 2000 is classified into a pinion assist type, a rack assist type, a column assist type, or the like, depending on the portion where the auxiliary torque is applied to the steering system 520. FIG. 25 shows the power steering device 2000 of the pinion-assist type. However, the power steering device 2000 is also applied to the rack assist type, the column assist type, and the like.

Not only a torque signal but also a vehicle speed signal, for example, can be input to the ECU 542. The microcontroller of the ECU 542 can vector-control the motor 543 based on a torque signal, a vehicle speed signal, or the like.

The ECU 542 sets a target current value at least based on the torque signal. It is preferable that the ECU 542 sets the target current value in consideration of the vehicle speed signal detected by the vehicle speed sensor and further in consideration of the rotation signal of the rotor detected by the angle sensor. The ECU 542 can control the drive signal of the motor 543, that is, the drive current so that the actual current value detected by the current sensor matches the target current value.

According to the power steering device 2000, the left and right steering wheels 529A and 529B can be operated by the rack shaft 526 by utilizing the combined torque obtained by adding the auxiliary torque of the motor 543 to the steering torque of the driver. In particular, by using the motor drive assembly 1000 of the above-described example embodiment for the above-mentioned mechanical/electrical integrated motor, it is possible to appropriately control the current in both the normal state and the failed state. As a result, the power assist in the power steering device is continued in both the normal state and the failed state.

Here, a power steering device is mentioned as an example of the usage in the power converter and the drive of the present disclosure, but the usage of the power converter and the drive of the present disclosure is not limited to those described above. It is applicable to a wide range including a pump and a compressor.

The above-described example embodiments and modified examples are to be considered in all respects as illustrative and not restrictive. The scope of the present disclosure is shown not by the above-described example embodiment but by the scope of the claims, and is intended to include all changes within the meaning and scope equivalent to the scope of claims.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A power converter that converts power from a power source into power to be supplied to a motor having n-phase windings where n is an integer of 3 or larger, the power converter comprising:
    an inverter including switches connected to the windings;
    a controller to control operation of each of the switches of the inverter; and
    a failure detector to detect a sign of failure in a drive system ranging from the power source to the motor; wherein
    when the sign of failure is detected by the failure detector, the controller is configured or programmed to check presence or absence of a failure in the drive system while supplying the power to the motor by causing the inverter to perform a failure operation.

2. The power converter according to claim 1, wherein when the presence of the failure is confirmed, the controller is configured or programmed to supply the power to the motor by causing the inverter to perform a failure avoidance operation that avoids use of a portion where the failure has occurred.

3. The power converter according to claim 2, wherein the failure avoidance operation is same as the failure operation.

4. The power converter according to claim 1, wherein to check the presence or absence of the failure, the controller is configured or programmed to individually check at least presence or absence of a failure in the switches.

5. The power converter according to claim 1, wherein when absence of a failure is confirmed as a result of failure confirmation, the controller is configured or programmed to cause the inverter to execute an operation in the normal state.

6. The power converter according to claim 1, wherein
    the controller is configured or programmed to select and execute the failure operation from a plurality of types of operations; and
    the inverter turns off all of the switches during a time when the controller selects the failure operation.

7. The power converter according to claim 1, wherein
    when detecting the sign of failure in the drive system, the failure detector is configured or programmed to distinguishingly detect the sign of failure related to each phase of the motor; and
    the controller is configured or programmed to select and execute an operation according to a phase related to the failure among a plurality of types of operations as the failure operation.

8. The power converter according to claim 1, wherein
    the inverter includes a first inverter connected to first ends of the windings and a second inverter connected to second ends of the windings;
    when the failure detector detects the sign of failure in the drive system, the failure detector is configured or programmed to distinguishingly detect a sign of failure related to the first inverter and a sign of failure related to the second inverter; and
    the controller is configured or programmed to select and execute an operation corresponding to an inverter related to the failure among a plurality of types of operations as the failure operation.

9. The power converter according to claim 8, wherein the controller includes a first controller to control operation of the first inverter and a second controller to control operation of the second inverter.

10. The power converter according to claim 8, wherein the power source includes a first power source to supply power to the first inverter and a second power source to supply power to the second inverter.

11. The power converter according to claim 1, wherein
    when the failure detector detects the sign of failure in the drive system, the failure detector is configured or programmed to distinguishingly detect each of a plurality of types of failure patterns; and
    the controller is configured or programmed to select and execute an operation according to the failure pattern from among a plurality of types of operations as the failure operation.

12. The power converter according to claim 11, wherein the inverter includes a first inverter connected to first ends of the windings and a second inverter connected to second ends of the windings, the power converter further includes:
- a first neutral point mechanism that is connected to the first inverter and defines a neutral point on a side of the first inverter; and
- a second neutral point mechanism that is connected to the second inverter and provides a neutral point on a side of the second inverter;

the controller is configured or programmed to select, and allow to execute, the failure operation from among at least two of the plurality of types of operations including:
- a first operation of providing a neutral point by the neutralization mechanism;
- a second operation of neutralizing the inverter by any of the switches in the inverter; and
- a third operation of operating any phase of the n phases.

13. The power converter according to claim 12, wherein the second operation is to neutralize the inverter by a switch connected between ground and the windings, among the switches in the inverter.

14. The power converter according to claim 11, wherein the failure detector is configured or programmed to detect the sign of failure in the drive system by detecting an abnormality in a state value at each of a plurality of locations in the drive system, and to set a bit corresponding to a location where the abnormality in the state value is detected among bits of a register; and the controller is configured or programmed to execute an operation corresponding to a value of the register among the plurality of types of operations, as the failure operation.

15. The power converter according to claim 1, wherein the controller is configured or programmed to reduce power supply to the motor over time during a time of checking presence or absence of a failure.

16. A drive comprising:
the power converter according to claim 1; and
a motor to which power converted by the power converter is supplied.

17. A power steering device comprising:
the power converter according to claim 1;
a motor to which the power converted by the power converter is supplied; and
a power steering mechanism to be driven by the motor.

* * * * *